United States Patent [19]
Ramsauer

[11] Patent Number: 5,970,757
[45] Date of Patent: *Oct. 26, 1999

[54] SWIVEL LEVER CLOSING DEVICE FOR DOORS OF HOUSING OR CABINETS

[76] Inventor: Dieter Ramsauer, Am Neuhauskothen 20, D-42555 Velbert, Germany

[*] Notice: This patent is subject to a terminal disclaimer.

[21] Appl. No.: 09/009,683

[22] Filed: Jan. 20, 1998

Related U.S. Application Data

[62] Continuation-in-part of application No. 08/822,479, Mar. 24, 1997, abandoned, which is a continuation of application No. 08/464,654, filed as application No. PCT/EP93/05437, Dec. 7, 1993, Pat. No. 5,685,181.

[30] Foreign Application Priority Data

| Dec. 22, 1992 | [DE] | Germany | 92 17 546 U |
| Apr. 20, 1993 | [DE] | Germany | 93 05 893 U |
| Oct. 5, 1993 | [DE] | Germany | 93 15 055 U |
| Aug. 29, 1997 | [DE] | Germany | 297 15 560 U |

[51] Int. Cl.$^6$ ................................. B60R 25/02
[52] U.S. Cl. .......................... 70/208; 70/215; 70/462; 292/39; 292/336.3
[58] Field of Search ................. 70/95, 99, 100, 70/120, 224, 207–210, 215, 462; 292/39, 336.3

[56] References Cited

U.S. PATENT DOCUMENTS

| 4,631,937 | 12/1986 | Debus et al. ........................ 70/207 |
| 4,754,624 | 7/1988 | Fleming et al. ..................... 70/95 |
| 4,930,325 | 6/1990 | Ramsauer ........................... 70/209 |
| 5,347,834 | 9/1994 | Ramsauer ........................... 70/120 |
| 5,419,167 | 5/1995 | Yamada et al. ..................... 70/208 |
| 5,685,181 | 11/1997 | Ramsauer ........................... 70/208 |
| 5,722,269 | 3/1998 | Simon et al. ....................... 70/208 |

FOREIGN PATENT DOCUMENTS

| 0261266 | 9/1988 | European Pat. Off. . |
| 0443177 | 12/1991 | European Pat. Off. . |
| 0504044 | 11/1992 | European Pat. Off. . |
| 2442943 | 8/1980 | France . |
| 2072740 | 3/1981 | United Kingdom . |
| 2208524 | 4/1989 | United Kingdom . |

*Primary Examiner*—Suzanne Dino Barrett
*Attorney, Agent, or Firm*—McAulay Nissen, Goldberg Kiel & Hand, LLP

[57] ABSTRACT

A swivel lever closing device for doors of housings or cabinets which preferably have walls of thin material such as sheet steel, in particular, for operating locking systems such as locking bars which can be installed in the fold space in sheet-metal cabinet doors. The swivel lever closing device is formed of a door plate which has a base plate with a swivel lever serving as a handle and with protuberances serving to engage in cut outs in the door, wherein a first protuberance is formed at one end of the door plate in the region of a locking arrangement for the swivel lever and another or second protuberance is formed at the other end of the door plate and is arranged at the door plate symmetrically with respect to rotation so as to be offset by 180° with reference to the actuating axis of the swivel lever, wherein a locking bar is provided which is in a working connection, via a latch, with the swivel lever and an articulated spindle pinion and with receptacles in the cabinet for locking elements formed in the region of the locking bar. Another swivel lever has a first door plate region and a second door plate region, wherein the first door plate region is formed by the base plate whose protuberances, as retaining block or retaining blocks, can be secured in the cut outs in the door leaf or the like, while the second door plate region is formed by a lateral shoulder which is connected with the base plate so as to form one or more parts, a push plate which is adjustable parallel to the axis of the locking bar being supported at the inside of the lateral shoulder.

25 Claims, 16 Drawing Sheets

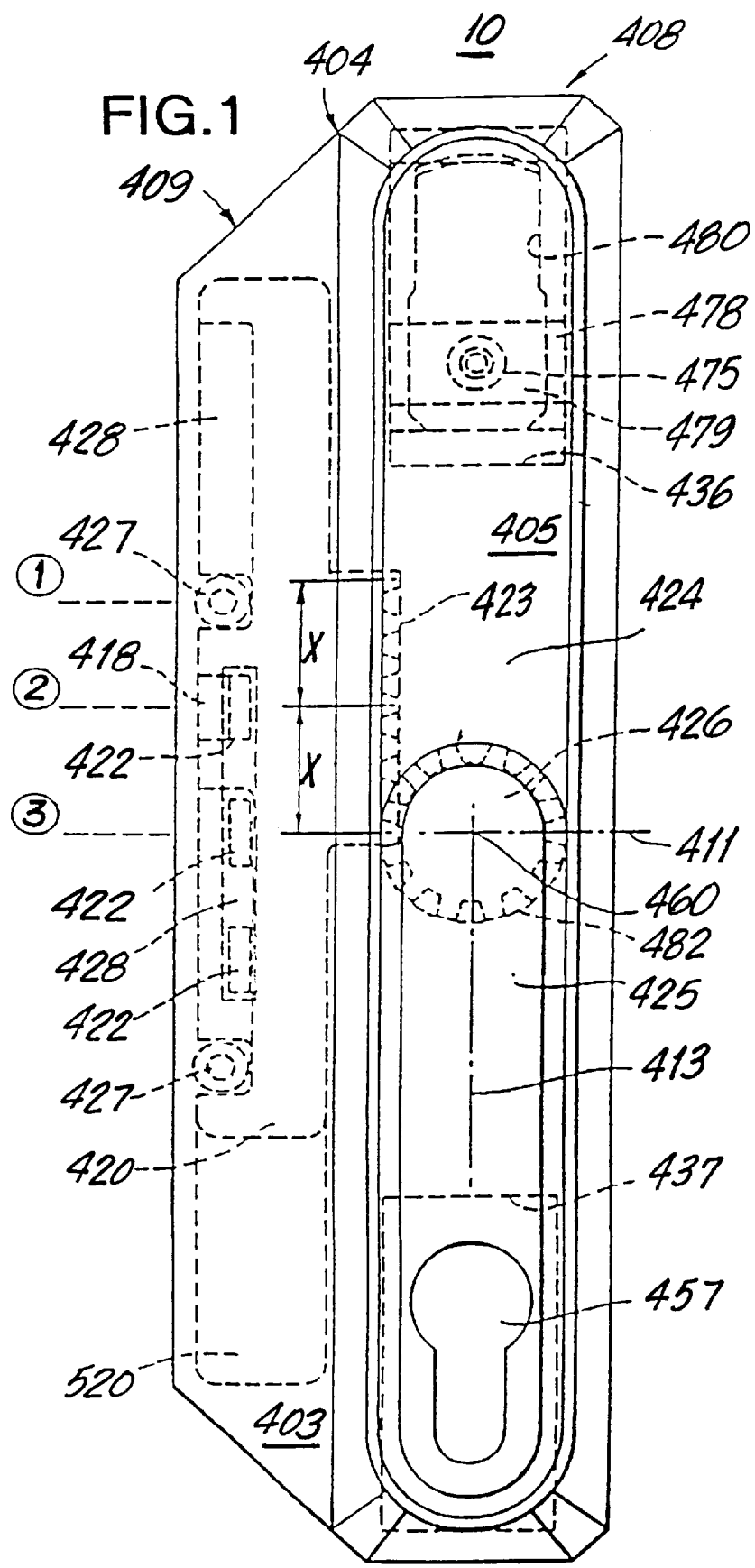

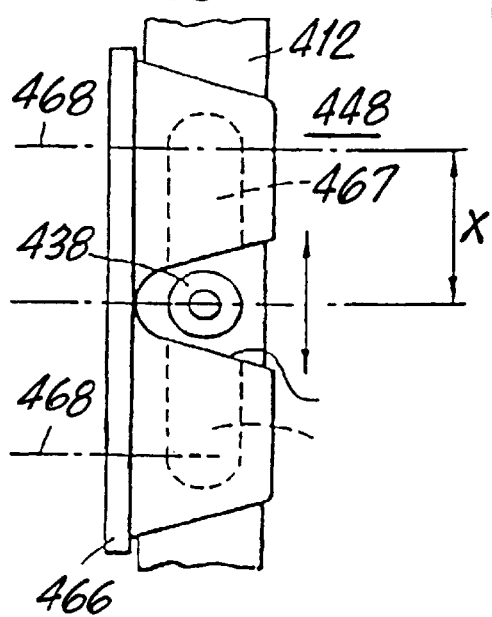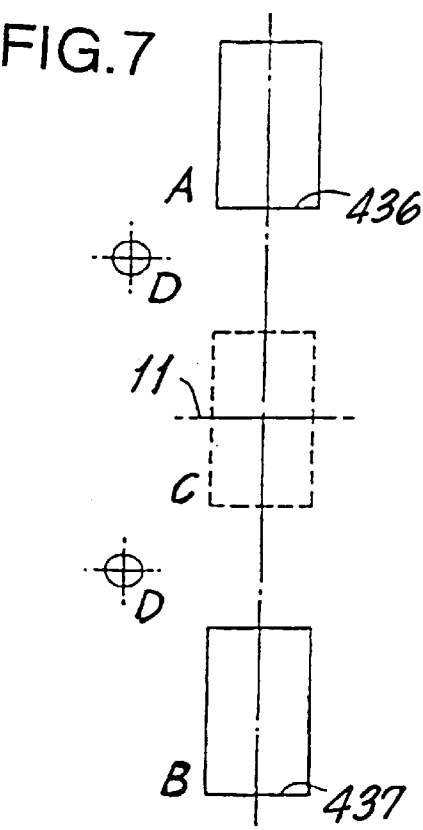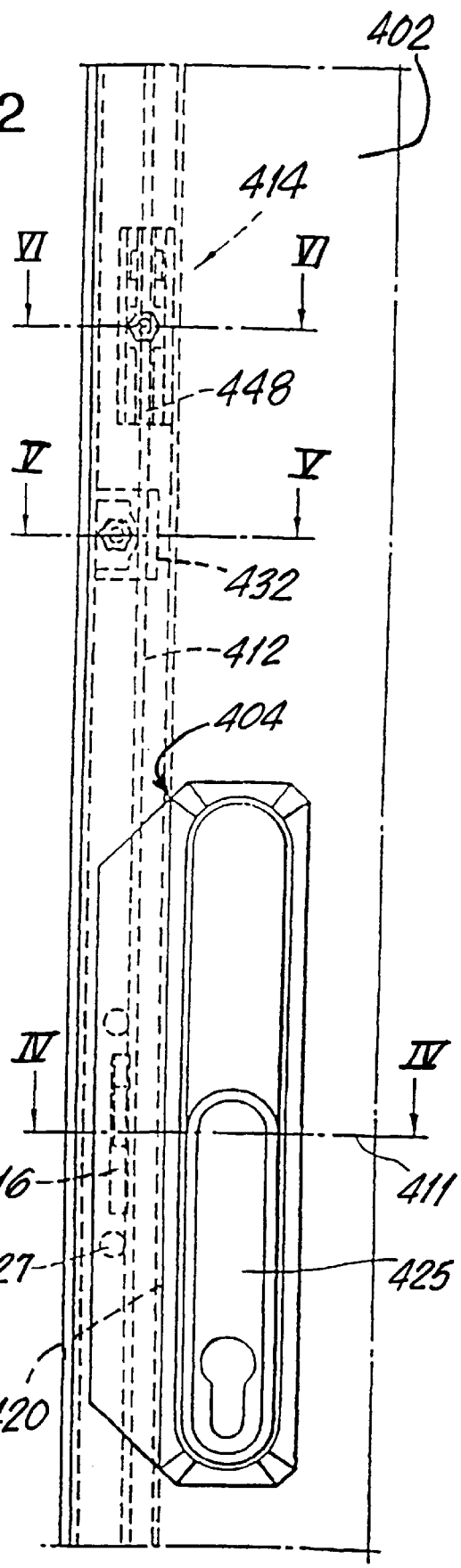

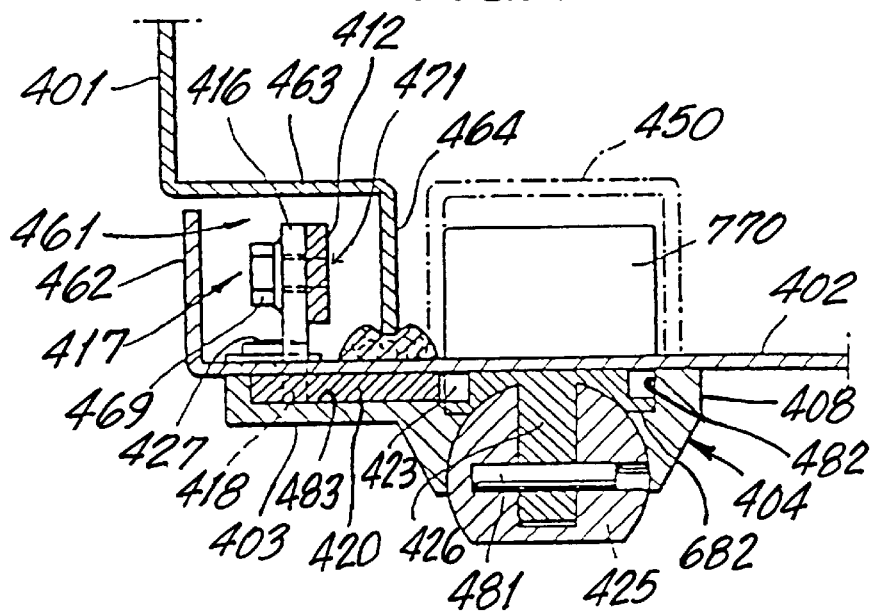
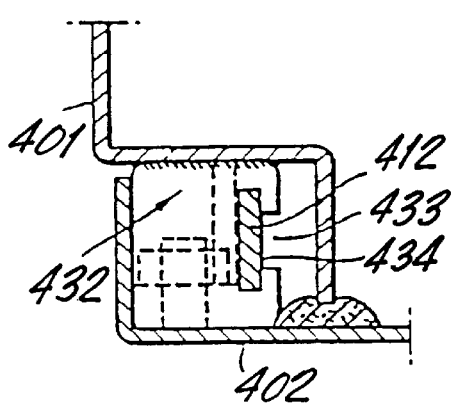
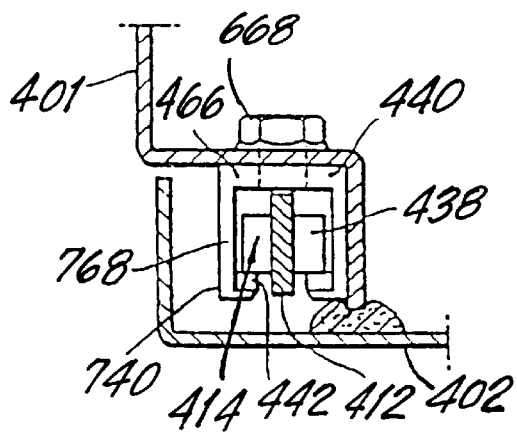

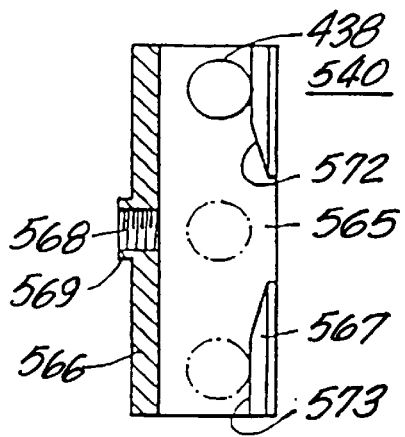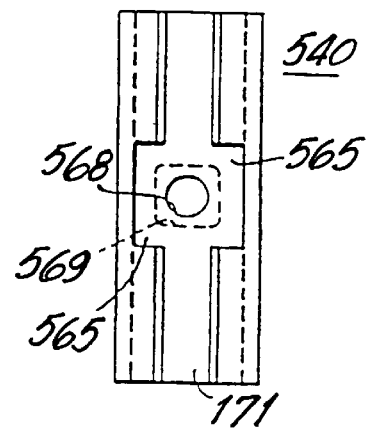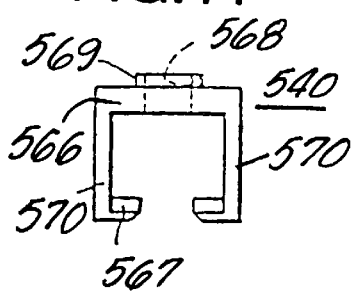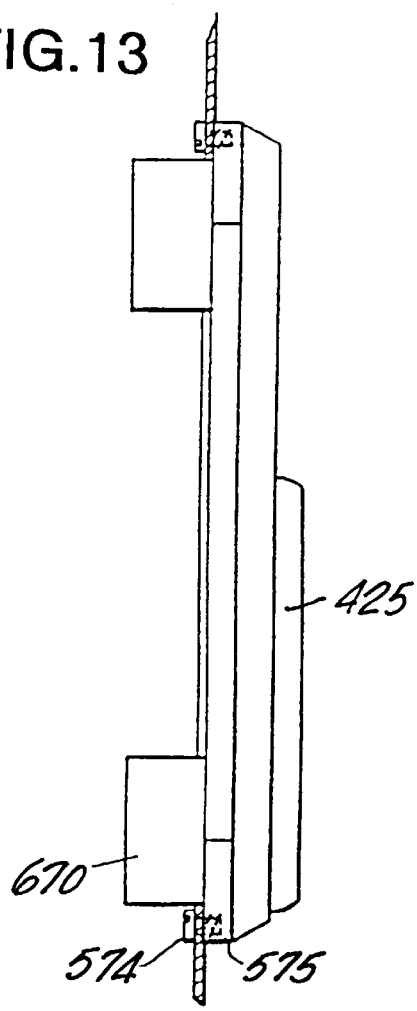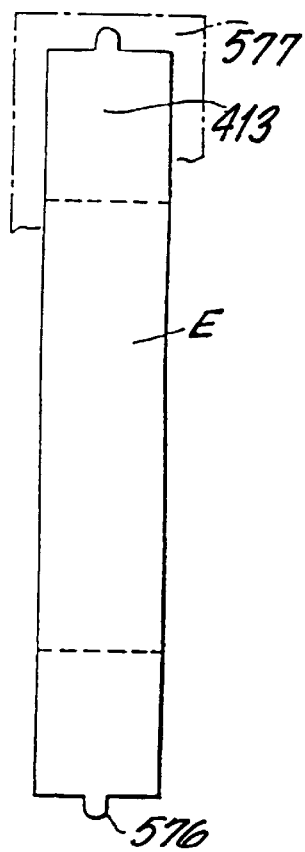

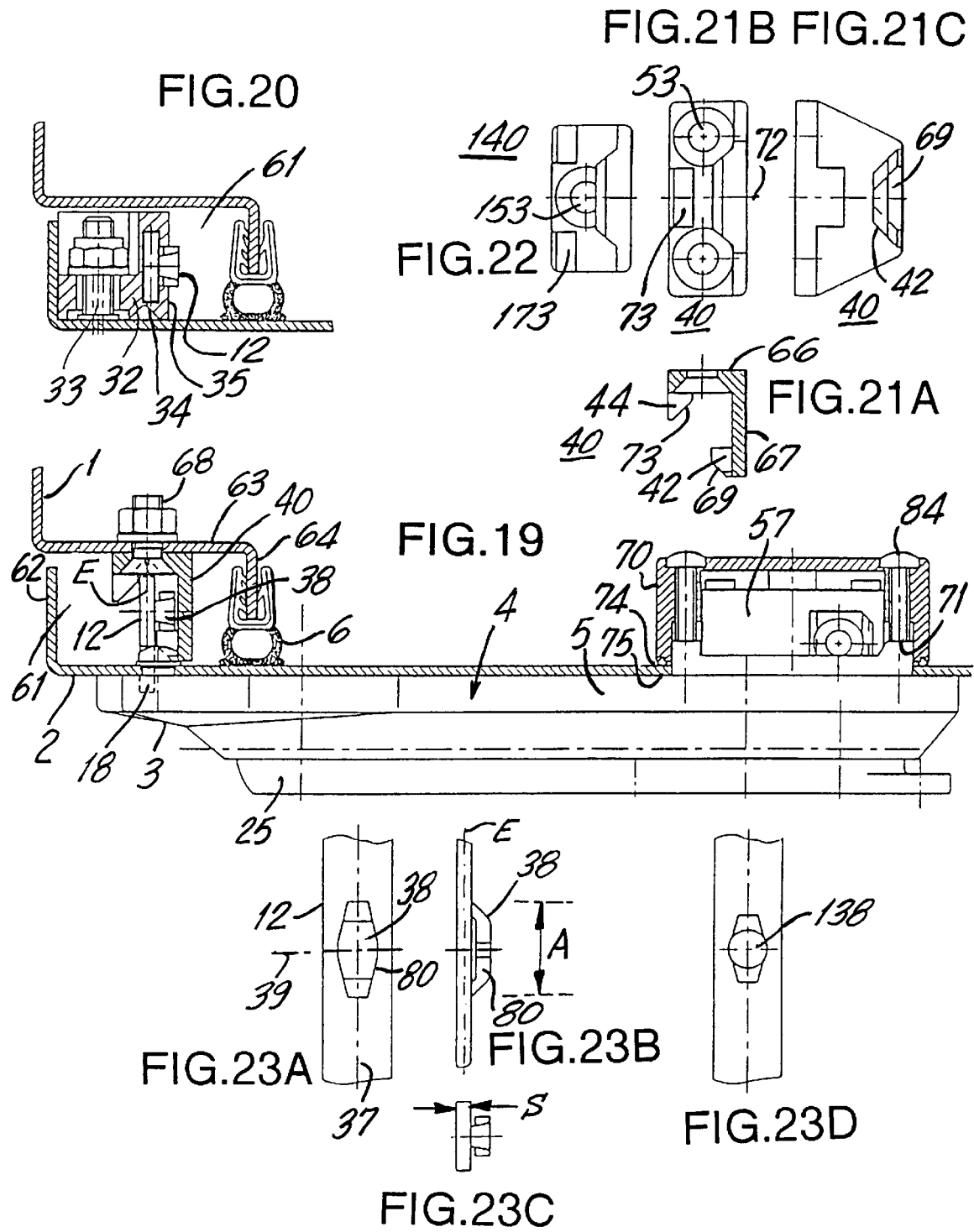

SWIVEL LEVER CLOSING DEVICE FOR DOORS OF HOUSING OR CABINETS

RELATED APPLICATION

This is a continuation-in-part of U.S. patent application Ser. No. 08/822,479, filed Mar. 24, 1997 and now abandoned, which is a continuation of U.S. patent application Ser. No. 08/464,654, filed Jun. 21, 1995, which issued as U.S. Pat. No. 5,685,181 which was a 371 of PCT/EP93/03437 filed Dec. 7,1993.

BACKGROUND OF THE INVENTION

The invention is directed to a swivel lever closing device for doors of housings or cabinets which preferably have walls of thin material such as sheet steel, in particular for operating locking systems such as locking bars which can be installed in the fold space in sheet-metal cabinet doors, which swivel lever closing device is formed of a door plate which has a base plate with a swivel lever serving as a handle and with protuberances serving to engage in cut outs in the door, wherein a first protuberance is formed at one end of the door plate in the region of a locking arrangement for the swivel lever and another or second protuberance is formed at the other end of the door plate and is arranged at the door plate symmetrically with respect to rotation so as to be offset by 180° with reference to the actuating axis of the swivel lever, wherein a locking bar is provided which is in a working connection, via a latch, with the swivel lever and an articulated spindle pinion and with receptacles in the cabinet for locking elements formed in the region of the locking bar. In another embodiment, the door plate has a first door plate region and a second door plate region, wherein the first door plate region is formed by the base plate whose protuberance(s), as retaining block or retaining blocks, can be secured in the cut outs in the door leaf or the like, while the second door plate region is formed by a lateral shoulder which is connected with the base plate so as to form one or more parts, a push plate which is adjustable parallel to the axis of the locking bar being supported at the inside of the lateral shoulder.

RELATED ART

A swivel lever closing device of this type is already known from EP 0504044 A1.

This closing device represents an improvement over a closing device known from EP 0261266 B1. The closing devices known from these two publications are provided for switch boxes, but also for cabinets or housings which are used in work places for electronics and other technical fields to house electronic devices or components. Such cabinets or housings usually have construction dimensions of 19 inches, but can also be manufactured in metric sizes. The use of especially narrow counter-folds has proven advisable to provide a usable interior space which is as large as possible and easily accessible. For example, a narrow hollow section serves as a mounting frame to which side walls or rear walls and doors are attached. Alternatively, switch boxes formed from bent sheet metal can also be provided, these switch boxes having a folded region in which locking devices, e.g., bar locks such as are already known from the cited references, are advisably accommodated. In the swivel lock device known from EP 0261266 B1, the base plate comprising the door plate is so disposed in the door leaf plate provided in the region of the swivel lever articulation that one of its protuberances or shoulders is arranged in a first rectangular opening, while a second protuberance or shoulder is provided for receiving a cylinder lock supported in the free end of the swivel lever. The described closing device and its base plate, respectively, have the same approximate length as the swivel lever. The two openings are arranged so as to be axially symmetrical with respect to the longitudinal axis and the closing device can accordingly be installed in these two rectangular openings of identical dimensions in such a way that it is possible to switch from the right-hand side to the left-hand side. However, the lock itself is arranged eccentrically. This eccentricity in the drive region has disadvantages. In contrast, the closing device according to EP 0504044 A1 has three rectangular openings of identical dimensions, the center opening being arranged centrally with respect to the door plate as is shown in FIG. 14 of this reference. The known swivel lever closing devices can be used for different door closures, but their use in combination with bar locks, especially with flat bar locks, is particularly advantageous because this provides particularly favorable opportunities for accommodation in narrow profile spaces such as in the fold space in sheet-metal cabinet doors.

The door plate is fastened by means of projections on its base plate which can be inserted into the openings of the door leaf, these openings being rectangular in particular and having identical dimensions, or which engage behind the openings or by means of a cap part or retaining part which is screwed on from the inside of the door (as is the case in EP 0261266 B1).

The known swivel lever closing devices require little space and are suitable for doors closing on the left-hand or right-hand side. However, in the case of the fitting according to EP 0261266 B1, when subsequently changing the side on which the door is fitted it is necessary to remove the locking bar, of which there is at least one, as well as the lock. Further, in both of the known closing devices, the locking bar which is guided in the region of the base plate may possibly be a hindrance to the construction design, particularly in the region of the cylinder lock. Preventing this by bending the locking bar increases production costs and makes the arrangement more complicated and the assembly more involved.

According to WO 94/15049, which is based on EP 0 261 266 B1, the second protuberance is not arranged in the region of the swivel axis of the swivel lever, but rather is arranged so as to be offset by 180° relative to the actuating axis of the swivel lever. This makes it possible to swivel the swivel lever optionally into one of the two positions in the base plate which are offset by 180° with respect to rotation and to secure it in the desired position by means of the cylinder lock accommodated in the swivel lever. Certain advantages are achieved by means of this design as are described in WO 94/15049 on pages 3 and 4.

WO 96/10679 discloses a bar-type closure with flat strip bars which are mounted edgewise and arranged in the fold space between the switch box frame and the switch box door, wherein the locking elements are formed in that the narrow edge of the bar is offset laterally from its normal straight-line configuration and forms the locking surface with this offset narrow edge (and with the narrow edge that is not offset).

OBJECT AND SUMMARY OF THE INVENTION

The primary object of the present invention is to provide a reliably functioning closing device which has a simple design and is suitable for cabinets and housings with narrow counter-folds. Further, installation should be possible on doors closing on the right-hand side and doors closing on the left-hand side using the same structural component parts and it should be possible to change the closing side subsequently with a very small amount of labor. In particular, it should not be necessary to bend the locking bars.

This object is met in that the door plate has a first door plate region and a second door plate region, the first door plate region being formed by the base plate whose protuberances, as upper and lower retaining blocks, can be secured in cut outs in the door leaf, while a second door plate region is formed by a lateral shoulder integral with the base plate, a vertically adjustable push plate being supported at the inside of the lateral shoulder as a latch, and in that the push plate has a first opening aligned with the center axis of the push plate for receiving the projection projecting from the closure housing and two additional recesses at an interval X along the longitudinal axis relative to this recess, wherein the interval X is the distance traveled by the push plate when the swivel lever is rotated by 90°.

This design offers three distinct possibilities of application for a swivel lever lock formed in this way without necessitating its removal from the door leaf. On the one hand, the swivel lever could be lockable in a position in which the swivel lever faces downward, whereas a position directed vertically thereto would be the open position of the lock. The upper articulated region in the base plate serving to receive the swivel lever could then be closed by a dummy insert.

Conversely, as an alternative, the lower protuberance could also remain unused and, if necessary, could be closed by an insert, while the upper protuberance functions as the receptacle for the cylinder lock and forms that position of the swivel lever in which the switch box or the like is closed. In this second alternative, also, the horizontal position of the swivel lever would be the position in which the door could be opened.

Finally, in a third possible alternative, the door would be closed with the swivel lever in the downward position and with the swivel lever in the upward position, whereas a horizontal position of the swivel lever oriented normal to the latter positions would be the open position for the switch box.

Given suitable different dimensions, there is even a fourth alternative in which one position of the swivel lever (e.g., the upward position) would be the closing position and the second position of the swivel lever, in which it is rotated downward by 180°, would be the open position so that in the process of swiveling by 180°, the closing device would move from the closed state to the open state and vice versa. A particularly advantageous application for the swivel lever device according to the invention has a locking bar which is in a working connection with the swivel lever and an articulated spindle pinion through a latch and has receptacles in the cabinet for locking elements formed in the region of the locking bar.

As has already been mentioned, the door plate according to the invention has a first door plate region and a second door plate region, the first door plate region being formed by the base plate whose protuberances, as upper and lower retaining blocks, can be secured in cut outs in the door leaf, while a second door plate region is formed by a lateral shoulder connected with the base plate, a vertically adjustable push plate being supported at the inside of the lateral shoulder as a latch. If the base plate and the lateral shoulder form one piece according to a further development, the base plate loses its symmetry with respect to the longitudinal axis as compared with the prior art. However, this loss is offset by the symmetry which is now provided according to the invention with respect to the transverse axis, so that it is still possible to switch from right to left, specifically without modifying or disassembling the swivel lever lock. According to another further development of the invention, however, the base plate and the lateral shoulder can form more than one part, that is, they can comprise two parts which can be connected with one another.

In both cases, the lateral shoulder provides the additional advantageous possibility of a more favorable accommodation of the locking bars and associated drive for certain types of applications, since it dispenses with bending on the one hand and with an opening in the door leaf for the actuating pin of the swivel lever on the other hand. Instead, the bars are driven above the plane of the door leaf by a pinion which engages in the push plate and displaces it in a reciprocating manner to actuate the locking bars. The connection between the push plate and the respective locking bars can then be adapted to the application in question. Embodiment forms are explained more fully in the following. For instance, for the purpose of a quicker fastening which can be changed subsequently if desired, the cut outs in which the base plate is held by the upper and lower retaining blocks are advantageously arranged in the region of or in proximity to a hat-shaped folded section on the door leaf, wherein the cut outs are advisably constructed so as to complement the retaining blocks, which are rectangular in particular, and it is provided that the retaining blocks are fastened with the fastening elements which can be inserted, if required, proceeding from the hat section or folded section or from the rear of the door leaf. For fastening purposes, bore holes are provided in the retaining block, e.g., in alignment with openings in the U-shaped section, so that a reliable and stable fastening of the base plate with the swivel lever and locking device can be achieved with fastening elements such as screws which are inserted proceeding from the U-shaped section. Other fastening possibilities are shown in the prior art.

Sealing can also be carried out by providing a sealing strip between the hat section, door leaf or the like and the retaining blocks or base plate. Moreover, sealing can also be effected in the region of the fastening elements and their openings.

The push plate mentioned above, which is arranged at the inner side of the shoulder or at the outer surface of the door leaf as a latch, is arranged so as to be vertically adjustable. The push plate which can be actuated via the handle and articulated spindle pinion is in a working connection with a locking bar which is arranged parallel to the push plate and provided with locking elements for engaging in receptacles provided in the cabinet or housing. The locking bar and push plate are connected by a driver or actuating finger which can be constructed so as to be reversible, enabling the lock to be reversed in a simple manner. Further, there are, for example, three different possible mounting positions which also enable adjustability.

An articulated spindle pinion advisably serves to displace the push plate. This articulated spindle pinion meshes with teeth provided on the push plate and accordingly imparts a vertical movement to the push plate which can be transmitted to the locking bar via the driver. Accordingly, when the door is closed, at least one locking element moves into a positive engagement and/or frictional engagement with at least one corresponding receptacle in the cabinet or housing.

It is particularly economical with regard to space to construct the door plate in such way that the articulated spindle pinion and push plate are received virtually in a positive engagement in a relatively flat intermediate space formed by the base plate and shoulder plate which can be integral with the latter. The 90-degree deflection formed between the push plate and locking bar also reduces the space requirement in the horizontal direction. Therefore, this deflection enables the use of a narrow counter-fold, that is, e.g., a narrow hollow section frame or fold space in housings and cabinets. The advantage herein consists in that a larger usable interior space is available for the arrangement of electrical and electronic components. Further advantages consist in the possible arrangement of a cable holder or cable guide at the inner side of the narrow section frame in addition to improved circulation of air and improved cooling of the devices and components.

Two openings are sufficient for centering and fastening the base plate of the closing device, these openings advisably having the same dimensions and lying symmetrically relative to the center axis of the door. The door can accordingly be turned around in a simple manner without requiring any modification of the closing device. Alternatively, an individual elongated opening can be provided.

A third opening can be provided in the region of the swivel axis of the swivel lever if desired. Further, additional circular openings can also be provided in the region of the lateral shoulder of the base plate to achieve additional stability.

The driver which can extend along virtually the entire length of the shoulder plate and can be connected with the locking bar via connecting regions engages in a recess of the push plate by means of a projection so that the vertical adjusting movements of the push plate are transmitted to the driver and locking bar.

The locking bar which is arranged vertically to the plane of the push plate and door surface, like the parallel driver, extends beyond the door plate region and is held in at least one rigid guide so as to be stable and adjustable. A bar guide of this type can be constructed, for example, from a guide block with a recess adapted to the cross section of the locking bar. The locking bar preferably has a rectangular cross section.

In order to simplify assembly and adaptability, it is advantageous to fasten the guide blocks at the inner side of the door so as to be detachable and, if need be, displaceable.

In view of the special design of the closure described herein with the two possibly lockable positions of the swivel lever, it is advisable that the locking elements also have a special shape.

For example, they may be formed of two rotating elements which are arranged horizontally on either side of the locking bar, in particular two rollers, and can comprise a receptacle in the cabinet or housing which receives the locking bar and rollers in this region and is constructed so as to complement the latter, these two rollers and the locking bar being held in the receptacle in a positive engagement or frictional engagement. This receptacle advantageously allows the rollers to move in from both directions, wherein the receptacle is effected centrally when the door leaf is swung out resulting in a locking when the rollers are displaced upward or downward from this central receiving space.

In so doing, it is advisable to provide vertically arranged wedge surfaces to facilitate the guiding-in of the locking elements.

In accordance with another embodiment of the present invention, the locking bar forms projections, punched-out portions or pressed out portions which project from the locking bar so as to be integral therewith and which, on the one hand, produce a working connection between the locking bar and push plate and, on the other hand, form locking elements which run into receptacles in the cabinet, and in that these projections, punched out portions and/or pressed out portions are symmetrically disposed with respect to the center of the longitudinal extension of the bar.

According to an advantageous further development of the invention, the projections, punched-out portions and/or pressed out portions which project from the locking bar so as to be integral therewith and which form the locking elements are also configured in a symmetrical manner with respect to the center of the longer transverse extension of the locking bar.

According to another further development of the invention, the locking bar, in order to form the locking elements in the region of the cross-sectional center of the locking bar profile, is offset from its longitudinal plane (E) over at least a portion (A) of its longitudinal extension, and the locking bar profile, with one of its offset narrow edges, forms the locking surface in the offset portion (A) or adjacent thereto, wherein a receptacle part of the locking element arranged in the cabinet parallel to the locking bar plane (E) engages over the locking surface.

The locking bar can be offset in its offset portion (A) by an amount corresponding to the thickness (S) of the locking bar or to twice the thickness (S) of the locking bar.

The narrow edges of the offset portion can form sloping surfaces. Alternatively, the offset portion can also form a circle as viewed from the top. According to another alternative, the offset portion can form a double-sided truncated pyramid as viewed from the top. In yet another embodiment form, the offset portion can form a circle with adjoining truncated pyramids as viewed from the top.

The offset portion can be locking protrusions which are formed by pressing out material or by stamping out material. The offset portion can also be formed by punching out material.

According to another further development of the invention, the cabinet-side closing element is L-shaped, wherein one side of the L serves to fasten the closing element and the other side of the L forms, at its free end, the hook part which engages the locking surface of the locking bar.

At the free end of the fastening side of the L, the closing element can form a guide web for one broad side of the locking portion (A) of the locking bar.

The guide web can form a diagonal or curved run-up surface in the direction of displacement of the bar.

The guide web can have a diagonal or curved run-up surface in the direction vertical to the bar axis.

The closing element can have at least one countersunk bore hole for receiving a fastening screw whose axis is aligned with the longitudinal axis (E) of the portion of the locking bar that is not offset.

The bore hole for fastening the closing element can lie outside the alignment of the hook part of the closing element, or the hook part can be set back in the region of the bore holes so that the head of a fastening screw can be accessed by an appropriate tool such as a screwdriver.

There are numerous possible embodiment forms with respect to the fastening of the door plate. For example, a different protuberance or a second protuberance can be formed at the other end of the door plate and arranged at the door plate symmetrically with respect to rotation so as to be offset by 180° with reference to the actuating axis of the swivel lever.

Alternatively, the door plate can have a first door plate region and a second door plate region, wherein the first door plate region is formed by the base plate whose protuberances, as upper and lower retaining blocks, can be secured in cut outs in a door leaf, while a second door plate region is formed by a lateral shoulder that is connected with the base plate so as to form one or more parts, a vertically adjustable push plate being supported at the inside of the lateral shoulder.

In addition to or instead of the retaining blocks, the door plate can have threaded bore holes in its surface facing the door leaf, wherein fastening screws which extend through the door leaf can be introduced into the threaded bore holes.

According to another embodiment form, the articulated spindle pinion can be connected with the push plate via meshing teeth, and the push plate can be connected with the locking bar via the projection and the recess, and the articulated spindle pinion and push plate can be received by the base plate and/or by the shoulder plate virtually in a positive engagement.

BRIEF DESCRIPTION OF THE DRAWINGS

The invention is described more fully in the following with reference to embodiment examples shown in the drawings:

FIG. 1 shows a top view of a closing device constructed according to the invention;

FIG. 2 shows a scaled-down view of this closing device in combination with locking bars fitted in a door leaf;

FIG. 4 shows a cross-sectional view of the closing device along lines IV—IV of FIG. 2;

FIG. 5 shows a cross-sectional view along lines V—V of FIG. 2;

FIG. 6 shows a cross-sectional view along lines VI—VI of FIG. 2;

FIG. 7 shows the hole pattern associated with the closure according to FIG. 2;

FIG. 8 shows a side view of the locking region shown in FIG. 6;

FIG. 9 shows an axial longitudinal section through a particularly advantageous construction of the locking part;

FIG. 10 shows a right side view of the part according to FIG. 9;

FIG. 11 shows a top view of the part according to FIG. 10;

FIG. 13 shows a side view of the arrangement according to FIG. 12;

FIG. 14 shows a hole pattern for an arrangement according to FIG. 12;

FIG. 19 shows a section along line IV—IV of FIG. 16;

FIG. 20 sectional view along line V—V of FIG. 16;

FIGS. 21A, 21B and 21C are different views of the cabinet-side closing element used in FIG. 16;

FIG. 22 is a view of an alternative cabinet-side closing element as used in FIGS. 17 and 18;

FIGS. 23A, 23B and 23C; 23D; 23E; 23F; 23G; 23H show a number of embodiment forms of a locking element of the locking bar;

FIGS. 24A and 24B show another alternative embodiment form of the locking element of the locking bar;

DESCRIPTION OF THE PREFERRED EMBODIMENTS

Figure 3:
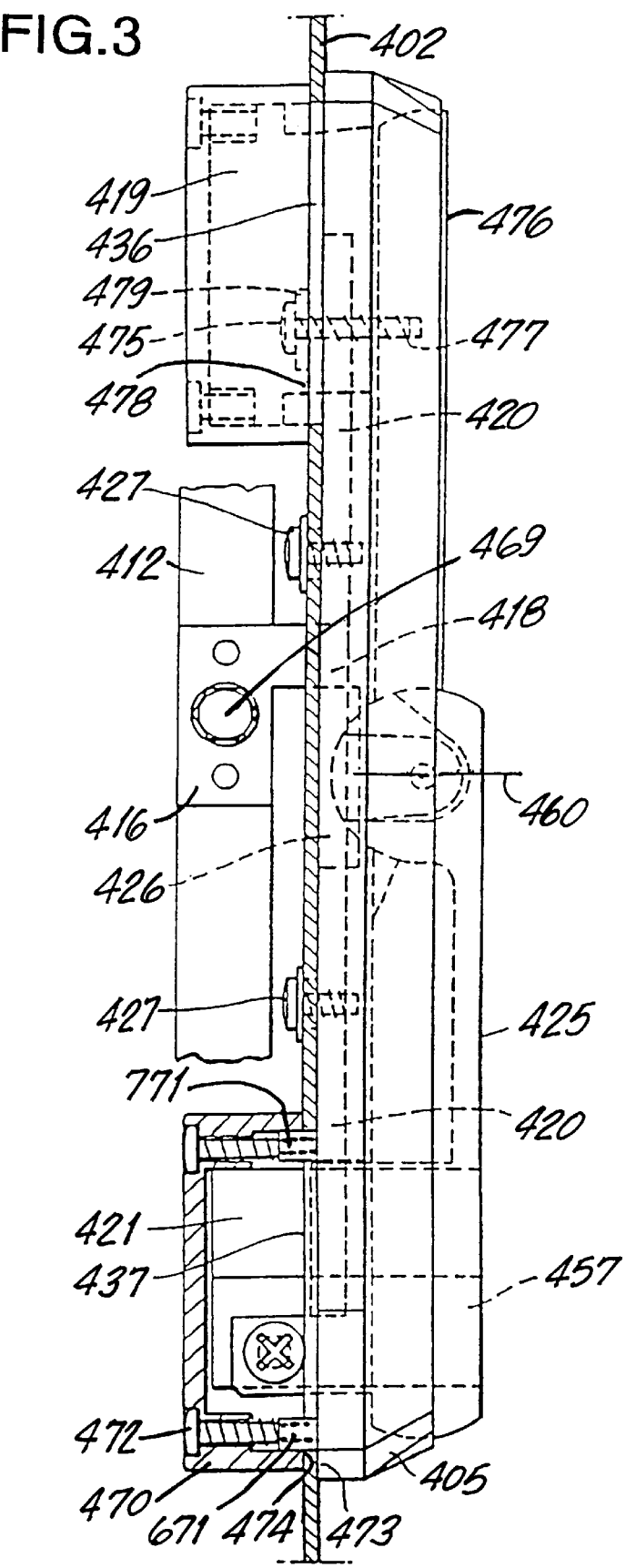
FIG. 3 shows a partially cut away side view of the swivel lever closing device shown in FIG. 1.

FIG. 1 shows a top view of a swivel lever closing device 410, designed according to the invention, in an exemplary arrangement according to FIG. 2 at a sheet metal cabinet door 402 which is in turn suitably fitted within a frame 401 of a switch box, sheet-metal housing or the like (see FIG. 4).

The swivel lever closing device has a door plate 404 which is arranged on the outer surface of the door leaf 402. The door plate 404 has a base plate 405 as a first door plate region 408 and a shoulder 403 as a second door plate region 409, this shoulder 403 preferably being connected integral with the base plate 405.

A swivel lever 425 is arranged as a handle in the region of the base plate 405 and can be secured in the closing position indicated in the drawing through a key-operated locking arrangement 456, preferably a cylinder lock 457. The locking arrangement, e.g., a cylinder lock 457, need not be accommodated in the swivel lever 425, as in the embodiment example shown in the drawing, but rather can also be arranged inside the door plate 404 and can hold the swivel lever in its swiveled-in position in a suitable manner.

In order to convert a left-handed door such as that shown in FIG. 4 into a right-handed door in a simple manner, the entire arrangement shown in FIG. 1 is constructed so as to be axially symmetrical with respect to a line 411 bisecting the door leaf 402. The corresponding hole pattern in the door leaf is likewise axisymmetrical around this axis 411 and comprises, e.g., the two rectangular openings A and B (see FIG. 7) or an elongated opening E (see FIG. 14).

Therefore, in order to carry out this conversion, the door leaf need only be rotated by 180° so that the portion of the door plate which was formerly at the top in FIG. 1 is now located on the bottom and the portion (shoulder) formerly on the left side is now on the right side. As a result of the symmetrical arrangement, the swivel lever can also be locked again in the swiveled-down position, for instance, so that it is possible to switch the closing side of the door leaf from the right side to the left side without changing the swivel lever closing device in any way.

On the other hand, reversibility can also be achieved in that the base plate 405 is constructed symmetrically around the longitudinal axis 413 and the shoulder plate 403, which is not integral with the base plate in this case, is switched as desired from one side edge of the base plate 405 to the other side edge. However, this is more involved and entails some assembly work in order to achieve reversibility from the right side to the left side.

Assembly can be effected within a hat section 450 or simply within the free space formed on the rear surface of the door leaf 402 (see FIG. 4). It is relatively unimportant which type of assembly is used, since the actual locking bar devices which take up space do not pass through this region as is the case in EP 0 261 266 B1, but rather pass through a region disposed at an offset thereto which extends parallel to the longitudinal axis 413 and lies substantially below the shoulder 403 and within the fold space 461 shown in FIG. 4 which is formed on one side by the fold 462 of the door leaf 402 and on the other side by the folds 463, 464 of the door frame 401 or the like as is clearly shown in FIG. 1. The locking bars which are also provided in the prior art and are constructed in this instance, as in the prior art, as upended flat bars 412, can also be conveniently guided within this fold space 461, e.g. by means of the bar guide which is shown in FIG. 5 as well as in the prior art (see FIG. 7 of the cited patent).

In a corresponding manner, closing elements comprising a lock part 440 which is secured to the door frame 401 and roller pins 438 which are supported by the flat bar 412 and can be inserted into this structural component part supported by the door leaf 401 can also be accommodated within this space. The prior art cited above also shows a similar construction in FIG. 6, although its shape which is asymmetrical around a horizontal axis would only have limited applicability in the present case.

For the purpose of symmetry with respect to construction and with respect to actuation, it is more advisable, according to FIG. 8, that the hook-shaped run-in elements provided as the closing element for the double roller pins 438 be doubled, specifically such that the double roller pins 438 can move into a conically widening slot 465 in a determined position of the locking bar 412 formed by the two open ends of two hooks 467 which are mounted on a common base 466 or project from the latter so as to be integral therewith. This base 466 is then fastened in turn to the door frame 401 by head screws which are shown in FIG. 6 (e.g., see reference number 468). The hook-shaped configurations 467 can be open as shown in FIG. 3 of the prior art (reference number 438) or can have side walls 468 to increase stability and prevent bending under heavy loading. Further particulars of an alternative embodiment form are shown in FIGS. 9 to 11 in which a base 566 which can be fastened to the door frame so as to be fixed with respect to rotation relative to it by means of only one screw (see rectangular projection 569 in the region of a threaded bore hole 568) supports two side walls 570 between which the bar with roller pins has sufficient room for displacement. At their free ends, these walls have strip shoulders which form run-over regions 567 and leave sufficient clearance 571 to allow the locking bar to pass through and a central clearance 565 allowing the roller pin 438 to pass through (see FIGS. 9 and IO). The run-over regions 567 have an inclined region 572 for drawing in the door and a planar region 573 for securing the door.

The position of the pin 438 shown in FIG. 8 is the open position, e.g., a position in which the swivel lever is swiveled into the horizontal line, for instance, while the moved-in position, e.g., in which the roller pin 438 running into the hook region is located at the bottom, would be the position in which the swivel lever is located in its lower (or upper) swiveled-in position, whereas the pin 438 is moved into the upper pocket according to FIG. 8 when the swivel lever is arranged in its upper (or lower) swiveled-in position.

As a result of the aforementioned symmetry with respect to the swivel lever region and closing elements according to FIG. 8 and FIGS. 9 to 11, the ratios are completely identical whether the doors close to the right or, after rotating by 180°, to the left.

Additional adjusting possibilities will become clear in the following more detailed discussion of the closure shown in FIGS. 1, 2, 3 and 4.

Figure 15:
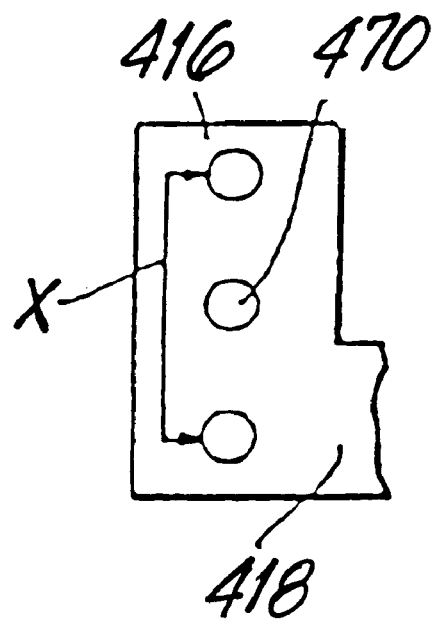
FIG. 15 shows the bar-shaped driver of FIG. 3.

FIGS. 2, 3 and 15 provide a schematic overall view of the closing device 410 according to the invention. As will be seen from the drawings, a bar-shaped driver 416 is provided in the region of the shoulder 403 of the door plate 404. This driver 416 is connected with a push plate 420 via a projection 418 (see FIGS. 1, 3 and 4) and is displaced in the vertical direction with this push plate 420. A locking bar 412 extends above and below the door plate 404 parallel to the driver 416 and is arranged along with the latter in a connection region 417 along the surface of the driver 416, e.g., by means of a screw bolt 469 which projects through one of three bore holes 470 shown in FIG. 3 and is screwed into a threaded bore hole 471 (FIG. 4) in the locking bar 412. As will be seen from the drawings, the locking bar 412 and the driver 416 are arranged vertically with respect to the inner side of the door 402 and relative to the plane of extension of the shoulder 403.

Alternatively, a flat strip bar 412 extending parallel to the door leaf 402 can, of course, also be provided, e.g., in that the projection 418 is bent again by 90° so that it can be connected with the locking bar 412, or a round bar can be provided and connected in a suitable manner with the projection 418.

FIG. 2 also shows that the locking bar 412 is provided above (and below, although this is not shown in the drawing) the door plate 404 with bar guides 432 fastened at the inner surface in the vicinity of the fold (see also FIG. 5). In this case, locking elements 414 which have also already been mentioned and shown in FIG. 6 as hook-shaped run-in elements, are provided in relative proximity to these bar guides (for the purpose of relieving the bar). These locking elements 414 have rollers 438 supported at both sides of the locking bar 412 with at least one receptacle 540 or 540 which are arranged in the cabinet or housing and can receive these rollers. The construction of this receptacle has already been discussed in detail in relation to FIG. 8 and FIGS. 9 to 11. FIG. 2 shows that a dependably functioning latching and locking can also be effected in particularly narrow receptacles 440 in the cabinet as a result of the locking bar 412 which is arranged vertically with respect to the inner side of the door, which also enables the use of relatively narrow vertical spaces or section frames for cabinets and housings as is the case in the prior art.

The arrangement of the locking elements and the bar guides in the respective corner regions results in a particularly high stability, also against rotation of these block-shaped elements, even when the latter are fastened only by one fastening bolt as is the case in the guide element according to FIGS. 5 and 9 to 11. For the same reason, as is shown in the drawing, the locking element according to FIG. 6 and FIG. 8 can also be fastened by two screw bolts 468 or only one screw bolt 468. The arrangement in the corner of the fold space reduces the risk of a rotation which would impede easy access.

Figures 30, 31, 32:
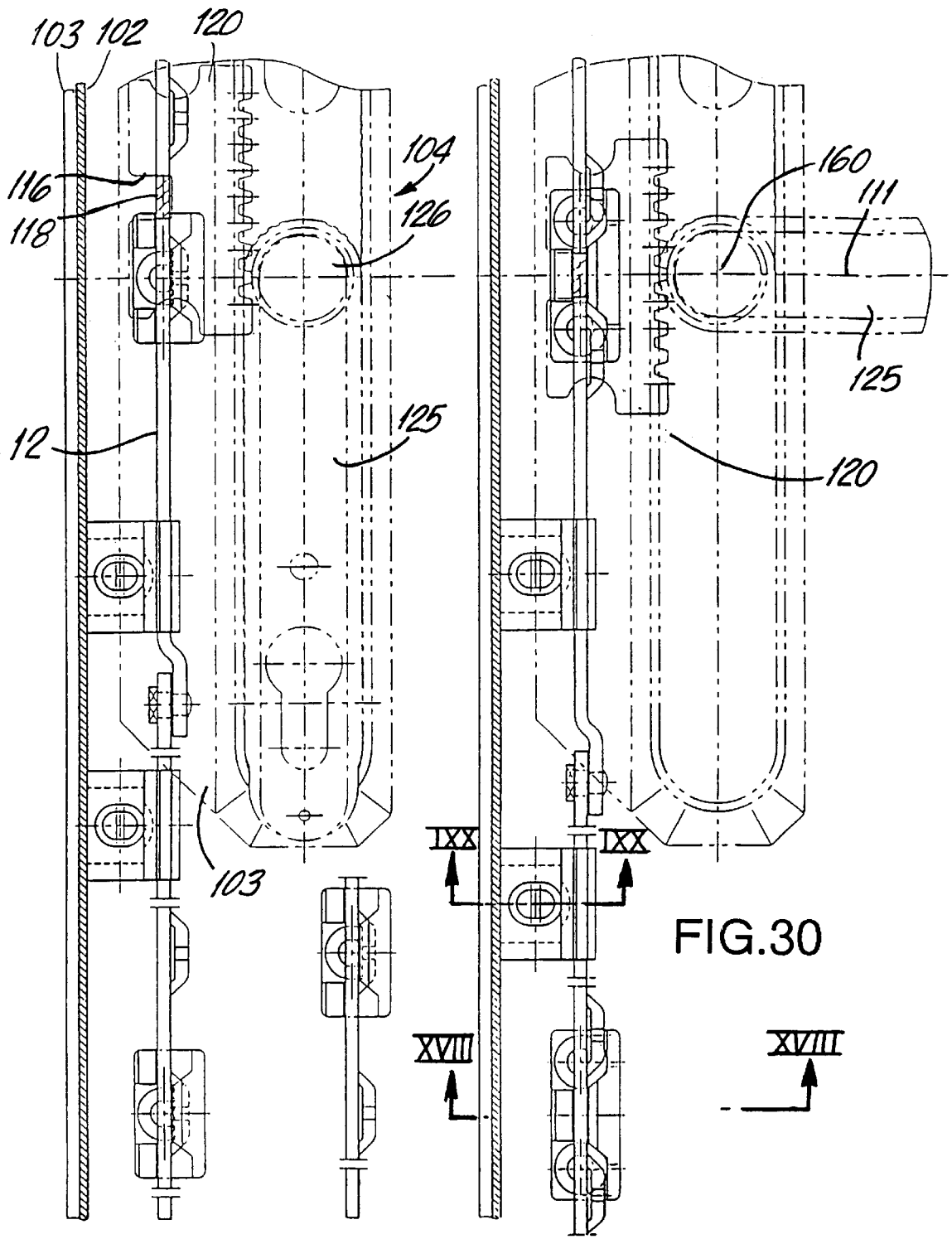
FIG. 30 is a view similar to FIG. 16 showing an alternative swivel lever actuation.
FIG. 31 shows an embodiment form similar to that in FIG. 30, but with a differently constructed cabinet-side closing element.
FIG. 32 is a partial view of FIG. 31 showing a different position of the locking bar.
Figure 34:
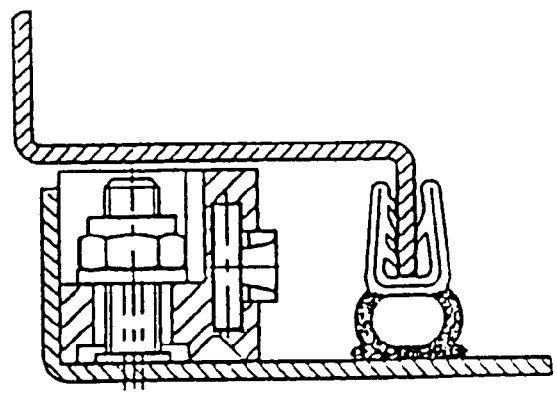
FIG. 34 is a sectional view along line IXX—IXX of FIG. 30.
Figure 33:
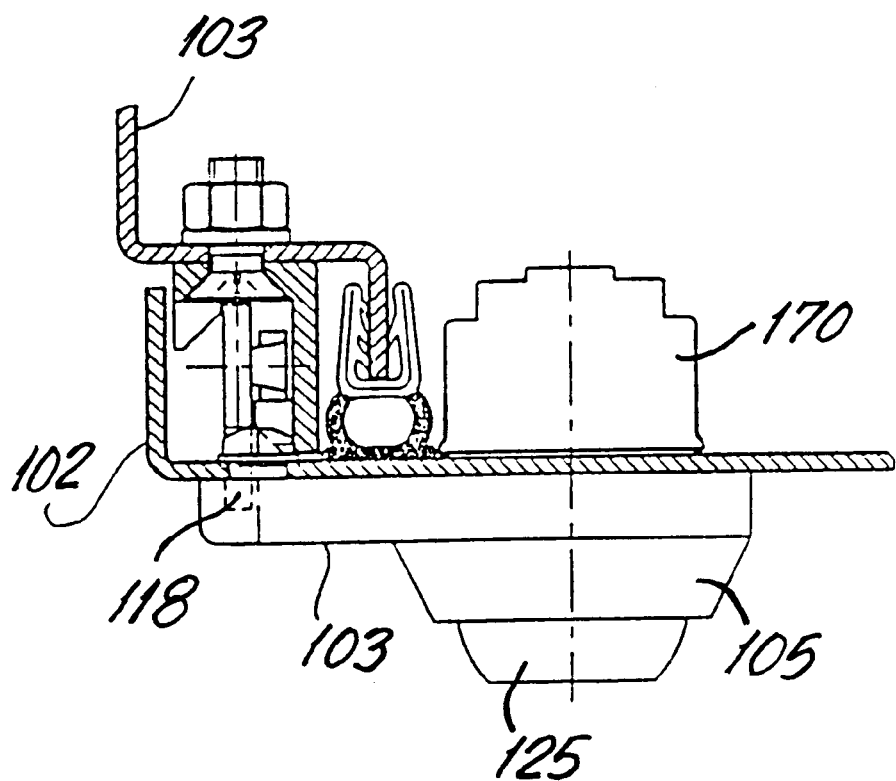
FIG. 33 is a sectional view along line XVIII—XVIII of FIG. 30.

FIG. 3 shows that the swivel lever 425 has virtually the same construction as that known from the prior art (e.g., see FIG. 31 of the prior art). The receptacle, shown at bottom in FIG. 31, for the free end of the swivel lever and the cylinder lock arranged therein is likewise provided at the upper end in the present construction according to the invention as shown in FIG. 3, so that the swivel lever 425 can not only be swiveled into the lower position shown in FIG. 3, but can also be swiveled by 180° into the upward position when needed.

When this possibility is provided, the elongated base plate 405 shown in FIG. 3 is outfitted at the upper and lower ends with a cover cap 470 for example. The latter is secured by two screws 472 which can be screwed into threaded bore holes 471 formed by the base plate 5. In so doing, the door leaf 402 is clamped between the rim regions 473 of the base plate on the one hand and the cup edges 474 of the cover cap 470 on the other hand so that the entire arrangement is secured within the door leaf. The projecting threaded bore hole regions 471 shown in FIG. 3 which serve to receive the screws 472 may also serve to center the base plate 405 within the openings formed by the door leaf, e.g., the rectangular openings A and B or 436, 437 shown in FIG. 7, or other protuberances, upper or lower retaining blocks or projections or edges which can be placed at the circumferential edges of the openings 436, 437 can be used for this purpose.

FIG. 13 shows another type of fastening in which screws 574 can be inserted into threaded bore holes 575 formed by the base plate, these screws 574 being guided through bore holes or notches 576 in hole pattern E according to FIG. 14. In this case, the caps can be guided through the elongated hole E and are thus not supported on the door leaf as in FIG. 3, but rather are tightly connected with the base plate 405, e.g., by gluing or ultrasonic welding. A circumferential sealing leaf 577 supported on the rim region of opening E can seal the remaining parts.

FIG. 3 also shows additional fastening possibilities, e.g., a screw 475 securing a plug or insert 476 which closes and fills the trough-shaped receptacle for the swivel lever 425 in the upper portion of the base plate 405 in the event that only the lower receptacle according to FIG. 3 is required for the swivel lever 425. This plug or insert 476 improves the aesthetic appearance, prevents penetration of dirt and dust and, by using correspondingly different colored material for the surface of this insert or by arranging suitable marks and identifiers, can serve for manufacturer identification or for customizing by the user. This insert is secured, for example, in that it has a threaded pocket bore hole 477 for screwing in the screw 475, whose head can be supported in a suitable manner on the inner surface of the door leaf 402, in which case this screw 475 would simultaneously act as a fastening for the base plate 405, or on a surface 478 formed by the base plate 405 itself, the plate 479 which then in turn secures the head of the screw 475 being supported on this surface 478.

The surface 478 is formed in a simple manner, for instance, in that the opening 480 provided in the base plate 405 for receiving the end of the swivel lever 425 containing the cylinder lock 457 leaves open a rim region on the surface 478 around opening 480 on which the plate 479 can be supported.

Since it is preferably integral with the base plate 405, the shoulder 403 can likewise serve to secure the base plate in the door leaf, e.g., by means of screws 427 which are guided through openings D according to FIG. 7 and are clearly emphasized in FIG. 1 and FIG. 3. These screws contact the inner surface of the door leaf 402 with their head (possibly with the intermediary of a washer) and are guided in a corresponding threaded bore hole of the shoulder 403 so that this shoulder is better secured at the door leaf. The push plate 420 which extends in this region and which will now be described more fully can have corresponding necked-down portions so that its movement is not impeded by these screws.

The closing device 410 is opened and closed by swiveling up the swivel lever 425 and correspondingly displacing the articulated spindle pinion 426 which is arranged in the region of the swivel axis 460 and serves as a nut for the lock. This adjusting movement is transformed into a vertical movement, e.g., by meshing teeth 424 of the pinion 426 with teeth 423 of the push plate 420, and is transmitted through the driver 416 to the locking bar 412 and the locking elements 414, of which there is at least one, arranged on the locking bar 412. As an alternative to the articulated spindle pinion, it is also possible to provide a finger which engages in the push plate to bring about the vertical movement or a fork-shaped part which is connected with the swivel lever and drives the driver 416 directly.

The push plate 420 is held in a positive engagement in an intermediate space formed by the shoulder 403 and the door 402 in a space-saving manner as shown in FIGS. 1, 3 and 4 in a top view, side view and plan view, respectively. The connection between the push plate 420 and the locking bar 412 is effected via a projection 418 which is formed at the driver 416 and is slid into a laterally arranged recess or opening 422. The circumference and number of teeth of the pinion 426 and the number of teeth 423 of the push plate 420 are so designed that a rotation of the pinion 426 by 90° causes a displacement, e.g., by three tooth intervals (distance X according to FIG. 1) and a further rotation by 90°, that is, a total displacement of 180°, causes a displacement by six tooth intervals or two times X. This distance of two times X corresponds exactly to the distance between lines 1, 2 and 3 shown in FIG. 1 and accordingly corresponds to the actuating length resulting for the push plate and for the locking bars articulated at the push plate when the lever is swiveled by 180°. Therefore, when the swivel lever 425 shown in FIG. 1 is swiveled out of the lower position shown in the drawing into the position in which it is swiveled up by 180°, the push plate 420 is displaced from the upper position shown in dashed lines (reference number 420) into a position designated by reference number 520 in FIG. 1. In so doing, the cut out part 428 of the push plate 420 slides past the upper fastening screw 427.

In the case of a closing element according to FIG. 8, this movement causes the roller pin 438 to move out of the open position as shown in FIG. 8 into one of the two possible closing positions, e.g., into the upward closing position, as a result of displacement by distance X. Conversely, closing can also be effected when the roller pin 438 is displaced downward by this distance X.

It may sometimes be advisable to change the closing position by switching the swivel lever position, which was formerly that of the open door, into a swivel lever position for a closed door and vice versa. In this case, it is possible to remove the projection 418 of the driver 416 from one of the three existing recesses 422 and to insert it into a second recess which is at a distance of X from the first recess.

Further, it is possible to convert the driver 416 on the locking bar 412 in such a way that the position of the locking bar 412 does not change, as will be seen from FIG. 3. For this purpose, it is necessary only to loosen the screw 469 and then lift the driver 416 and rotate it by 180° such that the projection 418 moves from the upper position shown in the drawing into the lower position, FIG. 3a, whereupon the driver 416 is again screwed on the locking bar 412 by means of screw 469. The projection now projects into the center recess 422 according to FIG. 1 instead of into the upper recess 422 according to FIG. 1.

The cross-sectional view according to FIG. 4 shows the cooperation of the swivel lever 425 and the articulated spindle pinion 426, at which the swivel lever 425 is articulated through an articulated pin 481, with the push plate 420, the articulated spindle pinion being supported so as to be rotatable and locked axially in an annular space 482 formed in the base plate 405. By means of the corresponding edge of the annular space 482, the base plate 405 accordingly prevents the pinion from being pulled downward by the swivel lever 425. Conversely, the pinion is also pressed against the edge by the swivel lever resulting in a stable rotational support. The row of teeth 423 of the plate 420 then meshes with the teeth 424 of this pinion 426 so that the plate 420 is supported in a sliding manner with slight play between the plane of the door leaf 402 and the inner surface 483 of the shoulder 3.

Figure 12:
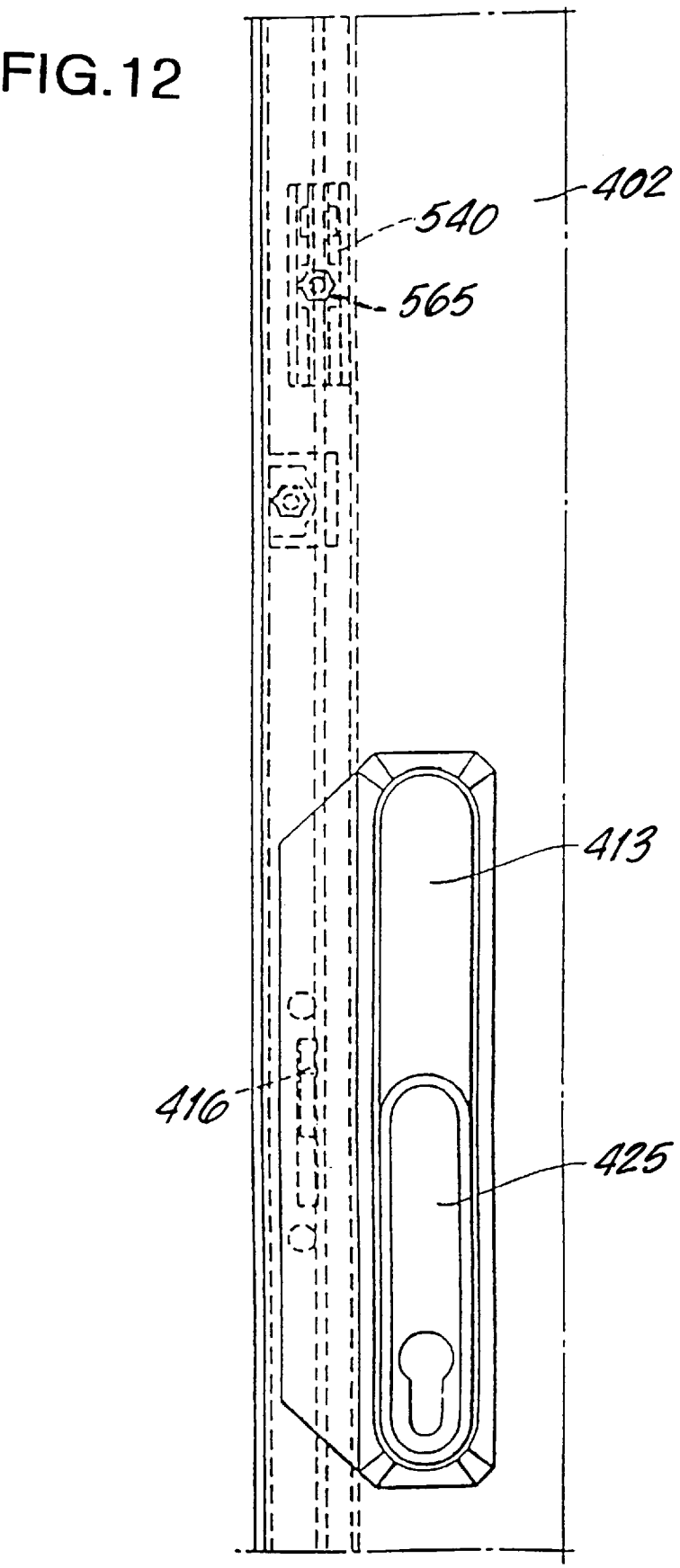
FIG. 12 shows a view similar to FIG. 2.

It will be clear from FIG. 12 in combination with FIGS. 3 to 6 that the driver 416 (with associated slot) lies outside the sealing region of the cabinet. Therefore, the slot in the fold area of the door leaf does not compromise the tightness of the seal. The slot can also serve as a stop for the movement of the driver 416 in that it has only a determined longitudinal extension. Accordingly, the open position, for instance, is unambiguously defined for the user, that is, the user need not search for the run-in region for the rollers 438 which is formed by the locking part 440 or 540. Rather, when reaching the stop, the rollers are situated exactly over opening 565, for example. To change this position, a plurality of axially offset openings 470 can be provided in the bar 412 and/or in the driver 416 similar to the way in which reversal is enabled by the conversion of the driver as was already mentioned.

Figure 16:
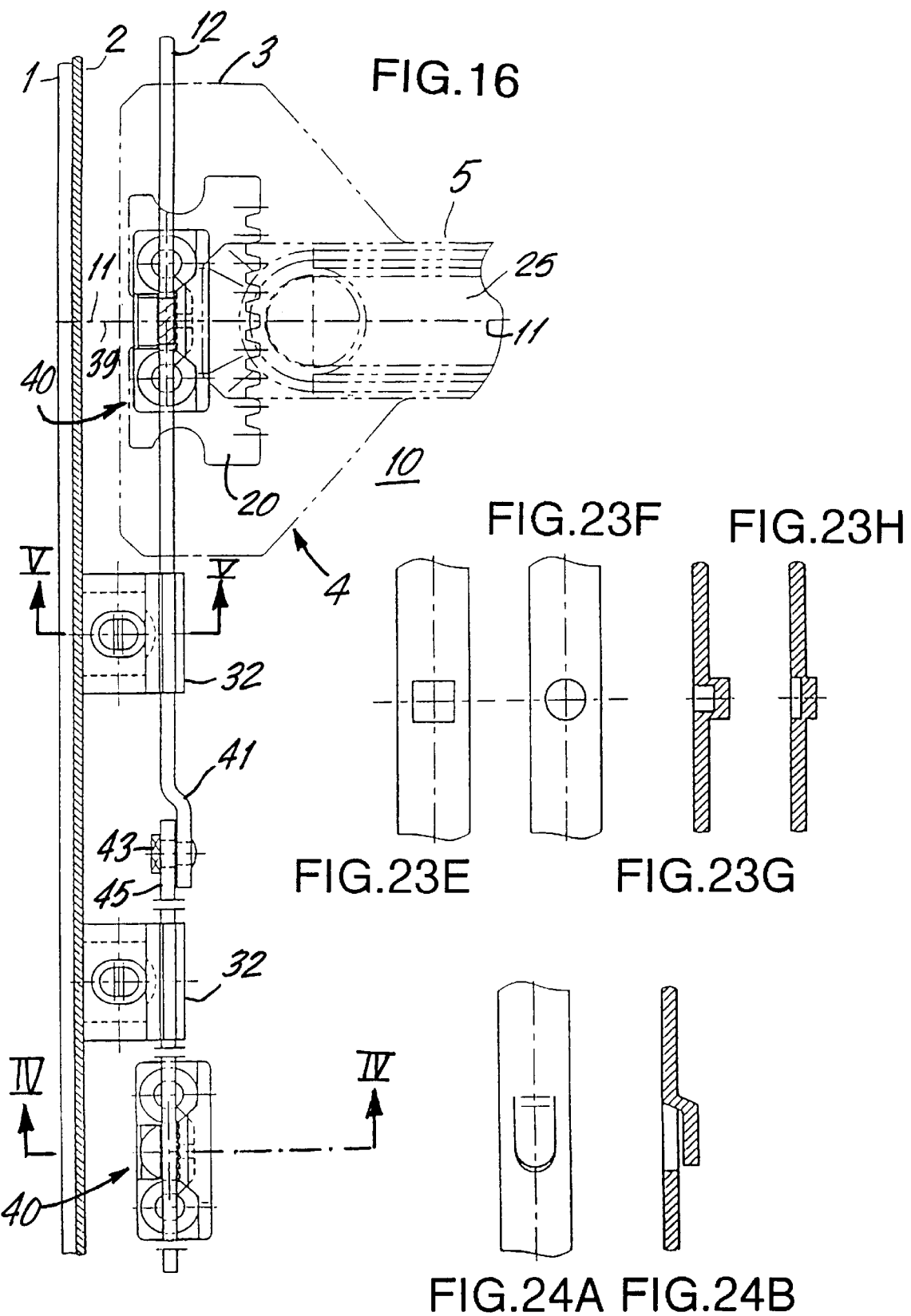
FIG. 16 is a top view of a first embodiment form of a closing device constructed according to the invention in a sheet-metal cabinet door, wherein the closure is in the locked position.

FIG. 16, in accordance with another embodiment of the present invention, shows a rear view of a door leaf 2 which is suitably fitted within a frame 1 of a switch box, a sheet-metal housing or the like (see FIG. 19). The door leaf 2 carries a swivel lever closure 10 comprising a door plate 4 which is arranged on the outer surface of the door leaf 2. The door plate 4 has a first door plate region 8 in the form of a base plate 5 and a lateral shoulder 3 which is preferably connected integral with the base plate 5 and forms the second door plate region.

A swivel lever 25 is arranged as a handle in the region of the base plate 5 and can be secured in the closing position indicated in the drawing via a key-operated locking arrangement 56, preferably a cylinder lock 57. The locking arrangement need not be accommodated in the swivel lever 25, as in the embodiment example shown in the drawing, but rather may also be arranged inside the door plate 4 or base plate 5 and can hold the swivel lever in its swiveled-in position in a suitable manner.

In order to convert a left-handed door such as that shown in FIG. 19 into a right-handed door in a simple manner, the entire arrangement shown in FIG. 16 is constructed so as to be axially symmetrical with respect to a line 11 bisecting the door leaf 2. The corresponding hole pattern in the door leaf is likewise axisymmetrical around this axis 11 and comprises, for example, a rectangular opening which is arranged centrally and symmetrically with respect to line 11. Therefore, in order to carry out the conversion mentioned above, the door leaf need only be rotated by 180° so that the portion of the door plate which was formerly at the top in FIG. 16 is now located on the bottom and the portion (shoulder 3) formerly on the left side is now on the right side. As a result of the symmetrical arrangement, the swivel lever can also be locked again in the same horizontal position, so that it is possible to switch the closing side of the door leaf from the right side to the left side without changing the swivel lever closing devices in any way.

The mounting of the base plate 5 can preferably be carried out in accordance with FIG. 19 by means of a cover or covering cap 70 which is fitted to the back face of the door leaf 2 and secures the base plate 5 mounted on the front face of the door leaf 2. As in EP 0 261 266 B1, the locking bar devices 12 which consume much space are advisably accommodated in the fold space 61 which, as can be seen, e.g., in FIG. 19, is formed on one side by the fold 62 of the door leaf 2 and on the other side by the fold 63, 64 of the door frame 1 or the like. The locking bars 12 which are also provided in the prior art and are constructed in this instance as upended flat bars 12 can also be conveniently guided within this fold space 61, for example by means of the bar guide 32, shown in FIG. 20, which may be secured in the corner area of the fold of the door leaf 2 by means of a screw bolt 33 which is welded onto the door leaf. The bar guide 32 which is shown here is made from plastic and is L-shaped, wherein one side of the L is secured by means of the screw bolt 33, and the other side of the L engages the longitudinal edges of the locking bar 12 so as to guide them, as can clearly be seen in FIG. 20. A film hinge 34 allows the hook 35 engaging around the bar 12 to fold away when the L-side 32 is detached and facilitates the introduction of bars 12 which, as in the present case, has nondetachable projections formed integral therewith, e.g., projection 18, bend 41, coupling 43, while the locking pin 38 carried by the bar 12 does not interfere with the mounting process and also does not constitute an obstacle when pushing through in the axial direction.

Similarly constructed guide elements are disclosed in WO 94/15049.

Correspondingly, in accordance with FIG. 19, closing elements can also be accommodated within this fold space 61. On the one hand, the closing elements comprise a receptacle 40 which is secured to the door frame 1 and, on the other hand, projections, punched out portions, or pressed out portions 38 which project from the locking bar 12 integral therewith and which can move into this receptacle 40 carried by the door leaf 1 and whose shape will be discussed more fully hereinafter.

One (of a plurality of) punched out portions 38 which are symmetrically arranged with respect to the center of the longitudinal extension 39 of the bar (see FIG. 16 or FIG. 17) can be seen in FIG. 23A. Additional devices provided in the path of the actuating bar 12 such as a bend 41 provided at the end of the bar and coupling devices 43 adjoining the bend 41 for connecting an additional locking bar piece 45 are also provided symmetrically and in duplicate, in each case with respect to the line 39.

This also applies to a projection 18 which projects laterally from the locking bar integral with the locking bar and is in a working connection with a push plate 20 which can be displaced by means of a laterally arranged toothing 23 in which a pinion 26 engages, this pinion 26 being in a working connection with the swivel lever.

Further, for the purpose of symmetry with respect to construction and with respect to actuation, it is advisable that not only the hand lever 25 and its base plate 5 or the shoulder 3 are arranged symmetrically with respect to the line 11 bisecting the door, but also the other pertinent elements that are to be fastened to the door, namely, in particular, the bar guides 32, each of which, in this case, should be arranged in pairs symmetrically around this line 11.

Figure 17:
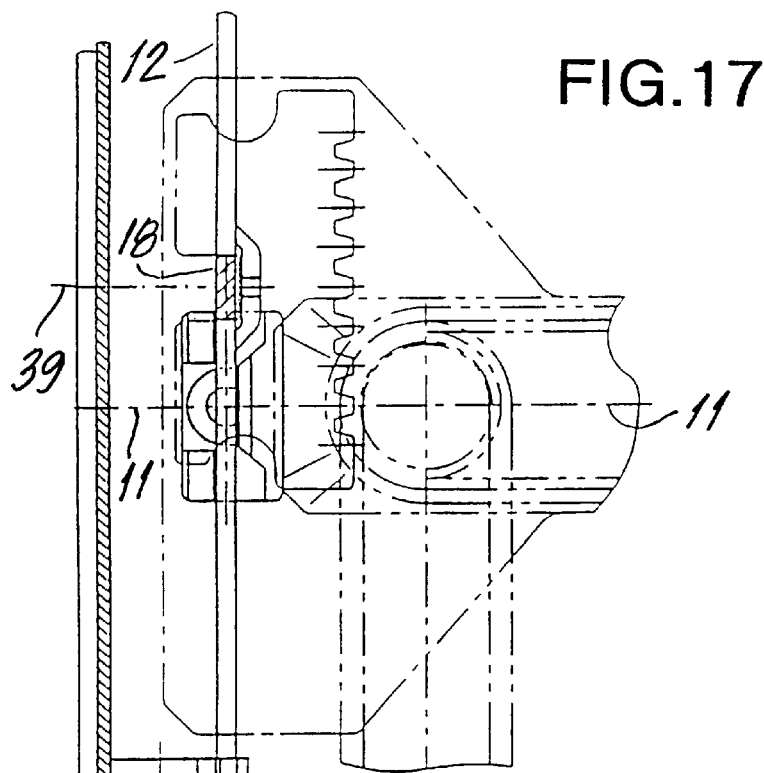
FIG. 17 is a view similar to that in FIG. 16 showing an embodiment form which is modified with respect to the cabinet-side closing element, shown here in the unlocked position.

Further, it is also helpful to align the corresponding locking elements or receptacles 40 that are fastened to the door frame such that they are arranged symmetrically relative to the line 11 of the door leaf, for example, in such a way that one element lies symmetrically on this line, while additional pairs of elements 40 are arranged above and below this line as is shown in FIGS. 16, 17 and 30.

For the same reason, it is advantageous to construct these elements 40 such that they are symmetric in themselves. This will now be discussed more fully with respect to the locking elements or receptacles 40. The locking element 40 which is fastened to the door frame 1 according to FIG. 19 substantially comprises an L-shaped structural component part as can also be seen in cross section in FIG. 21A, wherein one side of the L forms the mounting base 66 by means of which this structural component part can be secured to the door frame 1, for example by means of a countersunk head screw 68 which is shown in FIG. 19. The other L-side 67 extends vertically away from the support surface of the structural component part 40 and carries, at its free end, a hook 69 which forms sloping surfaces 42 that are symmetric to the center line 72 of the construction and are engaged when the locking portion 38 of the locking bar 12 moves in.

Another hook 44 proceeding from the base 66 of the retaining element 40 secures the lower end of the cross section of the bar and likewise has a sloping surface 73 which helps to bring the bar 12 into the position shown in FIG. 19 when closing the door.

As can be seen from FIGS. 21A, 21B and 21C, the locking element or receptacle 40 can have two countersunk openings 53 which are again arranged symmetrically with respect to the center line 72 of the structural component part. In the embodiment form according to FIG. 22, in which only one opening 153 is provided, this opening 153 is in turn arranged so as to be symmetric to the structural component part. For reasons of strength and for symmetry, the openings 53 and 153 for the fastening screws 68 are advisably aligned with the bar plane E which is not offset. This is clearly shown in FIG. 19.

It is further advantageous when the bore hole 53 and 153 for the fastening of the receptacle 40, 140 lies either outside of the hook part (69) as is shown in FIG. 21B or is set back as shown in FIG. 22 until the head of a fastening screw 68 can be accessed easily by an appropriate tool such as a screwdriver.

In principle, the locking bar 12 is constructed in such a way that a portion A along the longitudinal dimension is offset from its longitudinal plane E to form the locking element 38 (e.g., FIGS. 23A, 23B, 23C) or 138 (FIG. 23D) in the region of the cross-sectional center of the locking bar profile, and in such a way that the profile in this offset portion (A), with the offset narrow edges (see, e.g., 80), forms the locking surface which is engaged by the cabinet-side receptacle part (42) of the closing element (40) arranged parallel to the bar plane (E). The amount of offset advisably corresponds to as much as twice the thickness of the locking bar. As was already mentioned, the narrow edges 80 of the offset portion advantageously form sloping surfaces 80 which form a double-sided truncated pyramid in the top view in FIG. 23A, a circle with adjoining truncated pyramids in FIG. 23D, a square in FIG. 23E, a circle in FIG. 23F, and a rectangle with a rounded end in FIG. 24A.

The offset can be a punched out portion as is shown in FIGS. 23B and 24B, i.e., there are bridges of material to the bar at only one end or at both ends of the offset portion, or the offset can be a pressed out or stamped out portion which is further connected with the bar in all areas as can be seen from FIGS. 23G and 23H.

To enable both an upward and a downward displacement symmetric to the center position of the locking bar 12 shown in FIG. 16, an actuating device according to FIG. 16 or 17 and an actuating device according to FIGS. 30 and 31 are especially advantageous.

Figure 28:
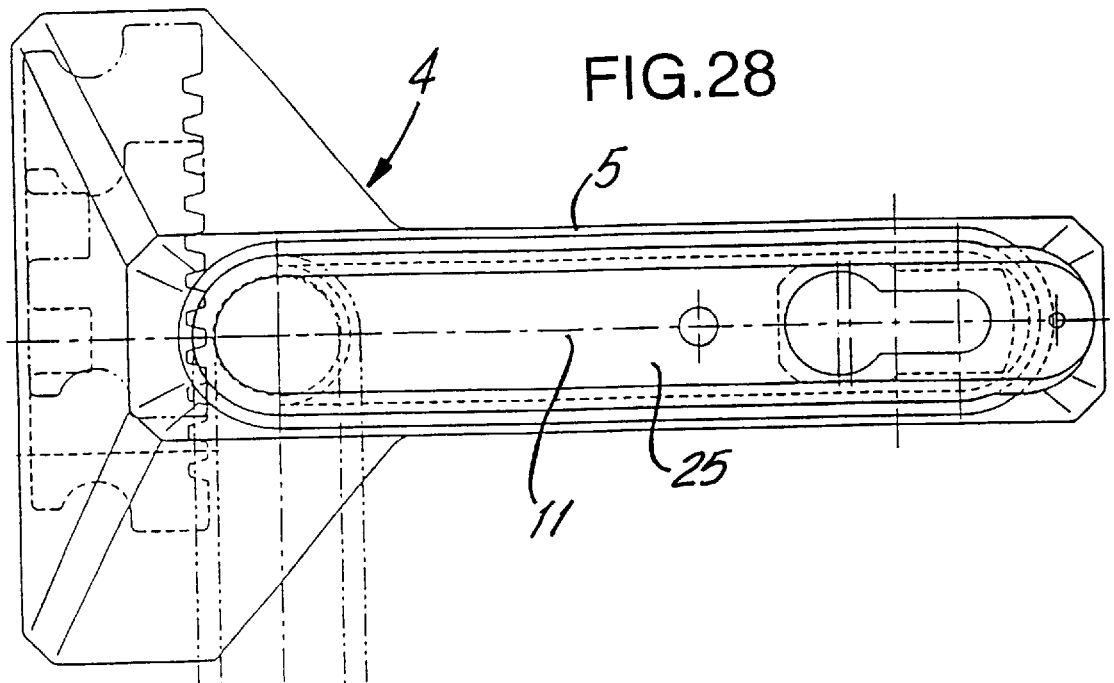
FIG. 28 is a front view of the arrangement according to FIG. 25.

In both cases, a swivel lever 25 is used which has virtually the same construction as the swivel lever known from the European patent. The base plate 5 which extends horizontally according to FIG. 28 of the present application is secured at one end by a cover cap 70 as was already mentioned. This cover cap 70 is secured by screws 84 which are screwed into two threaded bore holes 71 formed by the base plate 5. In so doing, the door leaf 2 is clamped between the rim regions 75 of the base plate on the one hand and the cup edges 74 of the cover cap 70 on the other hand, so that the entire arrangement is secured within the door leaf, wherein the projections in the threaded bore hole region 71 which serve to receive the screws 84 can serve to center the base plate 5 within the opening formed by the door leaf, or other projections and edges which can contact the circumferential edges of the opening in the door leaf can be used for this purpose.

Figure 29:
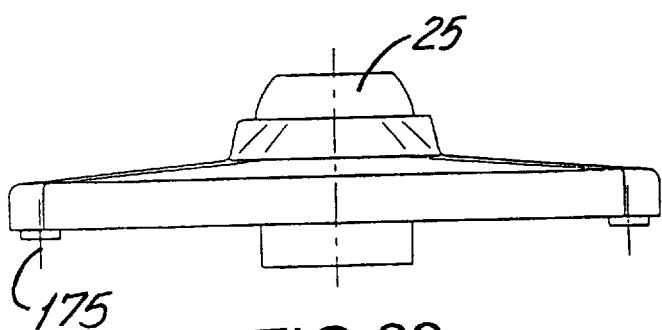
FIG. 29 shows the arrangement according to FIG. 25 from the right-hand side.

However, there are also other fastening possibilities for the door plate 4. According to FIGS. 25 and 29, screws can be arranged in threaded bore holes 175 and guided through corresponding bore holes or notches in the door leaf On the one hand, the screws contact the inner surface of the door leaf 2 with their head (possibly with the intermediary of a washer) and, on the other hand, are inserted in a corresponding threaded bore hole of the shoulder 3 so that this shoulder is better secured at the door leaf. The push plate 20 which is guided in this region has necked-down portions 21 so that its movement is not impeded by these screws 175 and their threaded area.

The closing device is opened and closed by swiveling the swivel lever 25 out of its swiveled in position and correspondingly displacing the articulated spindle pinion 26 which is arranged in the region of the swivel axis 81 and serves as a lock nut.

The rotating movement of the spindle pinion 26 is transmitted to its teeth and then to the teeth 23 of the push plate 20 meshing therewith and is accordingly transformed into a vertical movement of the push plate 20. The push plate 20 has a recess 16 in which the projection 18 of the locking bar extends, so that the movement of the push plate 20 leads to a movement of the locking bar 12.

Figure 18:
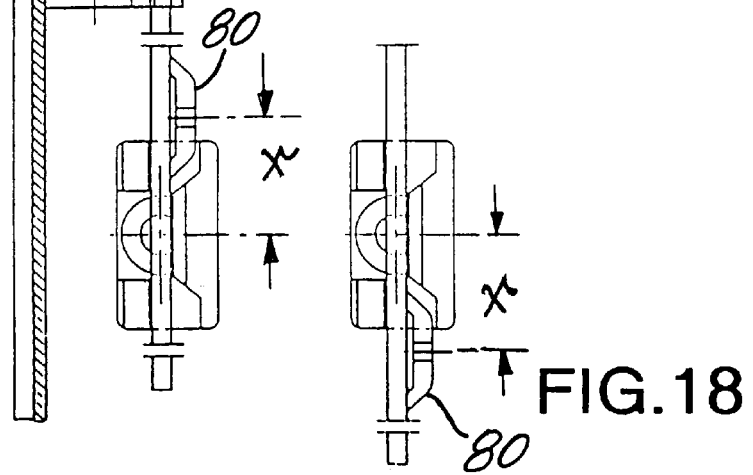
FIG. 18 is a partial view from FIG. 17 showing a closing element of another unlocked position of the locking bar.
Figure 25:
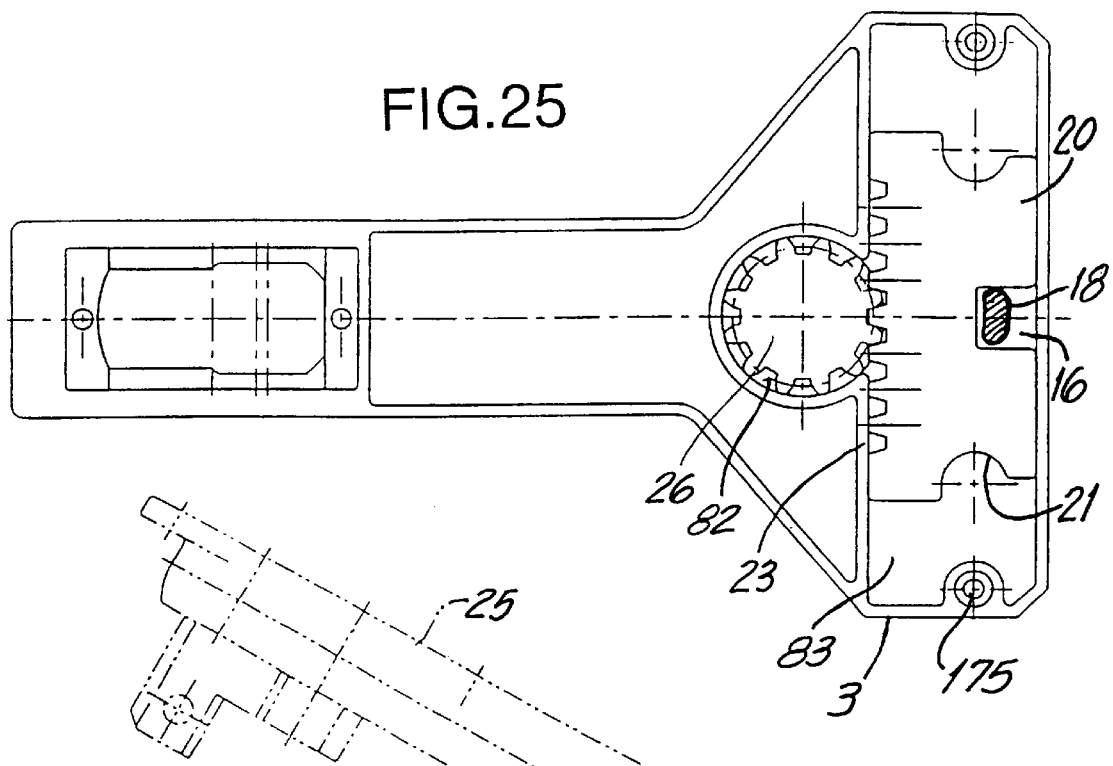
FIG. 25 shows a rear view of the swivel lever closing device used in FIG. 16.
Figure 27:
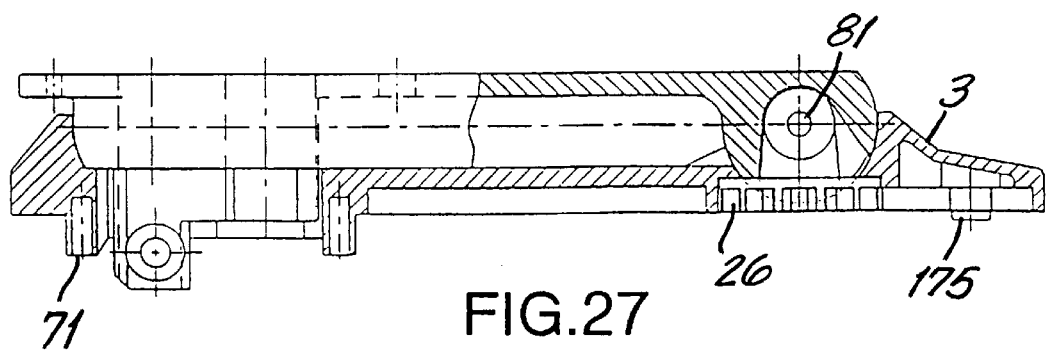
FIG. 27 shows an axial sectional view through the construction according to FIG. 25.

FIG. 25 and FIG. 27 show that it is possible for the push plate 20 to be received in an intermediate space formed by the shoulder 3 on the one hand and by the door 2 on the other hand such that the push plate 20 is tightly held in this space. The projection 18 formed by the locking bar 12 extends through a slot in the door leaf. The length of this slot corresponds to the length required by the movement of the push plate. This movement is determined by the circumference of the pinion and its quantity of teeth and by the quantity of teeth 23 of the push plate 20 which is configured, for example, in such a way that a rotation of the pinion 26 by 90° causes a displacement, e.g., by three tooth intervals. This corresponds, for example, to a displacement of the locking bar by a distance X (see FIGS. 17 and 18) at which the locking element 80 of the closing bar 12 moves out of an unlocked position with respect to the cabinet-side receptacles 40 into a locked position, or vice versa.

Figure 26:
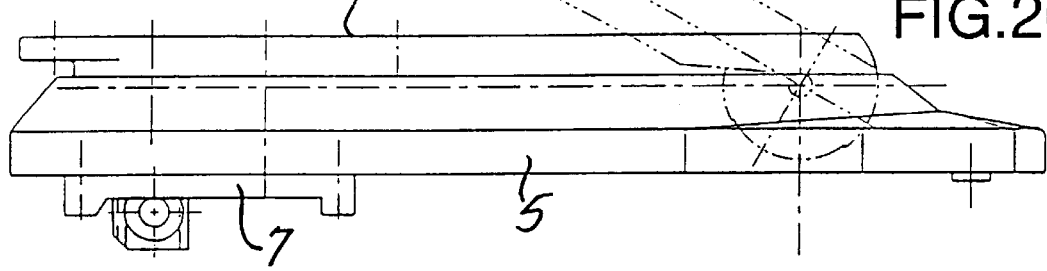
FIG. 26 is a side view of the construction according to FIG. 25.

The cross-sectional views according to FIGS. 19, 26 and 27 show the cooperation of the swivel lever 25 and the articulated spindle pinion 26, at which the swivel lever 25 is articulated via an articulated pin 81, with the push plate 20, the articulated spindle pinion being supported so as to be rotatable and locked axially in an annular space 82 formed in the base plate 5. By means of the corresponding edge of the annular space 82, the base plate 5 accordingly prevents the pinion from being pulled downward by the swivel lever 25. Conversely, the pinion is also pressed against the edge 82 by the swivel lever resulting in a stable rotational support. The row of teeth 23 of the plate 20 then meshes with the teeth of this pinion so that the plate 20 slides between the plane of the door leaf 2 and the inner surface 83 of the shoulder 3 (FIG. 25) and is supported with slight play.

It can be seen from FIG. 19 that the projection 18 (with associated slot in the door leaf 2) lies outside the sealing region of the cabinet, namely outside of the sealing strip 6. Therefore, the slot in the fold area 61 of the door leaf 2 required for the passage of the projection 18 does not compromise tightness. The slot can also serve as a stop for the movement of the projection 18 in that it has only a determined longitudinal extension. Accordingly, the open position, for instance, is unambiguously defined for the user, that is, the user need not search for the area in which the locking projection 38 runs in and which is formed by the receptacle 40. Rather, when reaching the stop, the projections 80 are situated in the area in which they run in, that is, at a distance X before the locking central position (see FIG. 18).

While FIGS. 16 to 29 relate to embodiment forms having an actuating lever disposed horizontally in the closing position, FIGS. 30 to 34 show embodiment forms in which the actuating lever can be swiveled so as to lock into two vertically disposed positions which are offset relative to one another by 180°.

Accordingly, the door plate 104 has a first door plate region which is formed by the base plate 105 whose protuberances, as upper (not shown) and lower retaining blocks, can be secured in cut outs in a door leaf 102, while the second door plate region is formed by a lateral shoulder 103 that is connected with the base plate 105 so as to form one or more parts, a vertically adjustable push plate 102 being supported at the inside of the lateral shoulder 103. This push plate can have the same form as that already described with reference to the embodiment forms described above.

The same is true for the locking bar and its guide elements as well as the locking elements communicating with the door frame 103.

In this case, also, the articulated spindle pinion (126) is connected with the push plate (120) via meshing teeth, and this push plate is connected with this locking bar 12 via its recess and the projection 118 of the locking bar, wherein the articulated spindle pinion 126 and the push plate 120 are again also received by the base plate 105 and/or by the shoulder plate 103 virtually in a positive engagement.

The construction according to FIGS. 30 and 31 is effected in such a way that when the hand lever 25 is swiveled downward (see FIG. 31), the push plate 120 is in its upwardly displaced position in which the locking elements of the push bar 112 are located in the cabinet-side receptacles and the door is locked. When the hand lever 125 is swiveled into the horizontal position as can be seen in FIG. 30, the push plate 120 is displaced by three tooth intervals (distance X), in which position the locking elements of the locking bar are released and the door can be opened.

In order to convert a left-handed door into a right-handed door, it is necessary only to turn the door by 180°, whereupon the same conditions take effect as those just described above: the closed position is that in which the hand lever 125 is swiveled downward (with reference to the original upward position of the door), while the open position is achieved in the horizontal position of the hand lever.

Figures 35, 36:
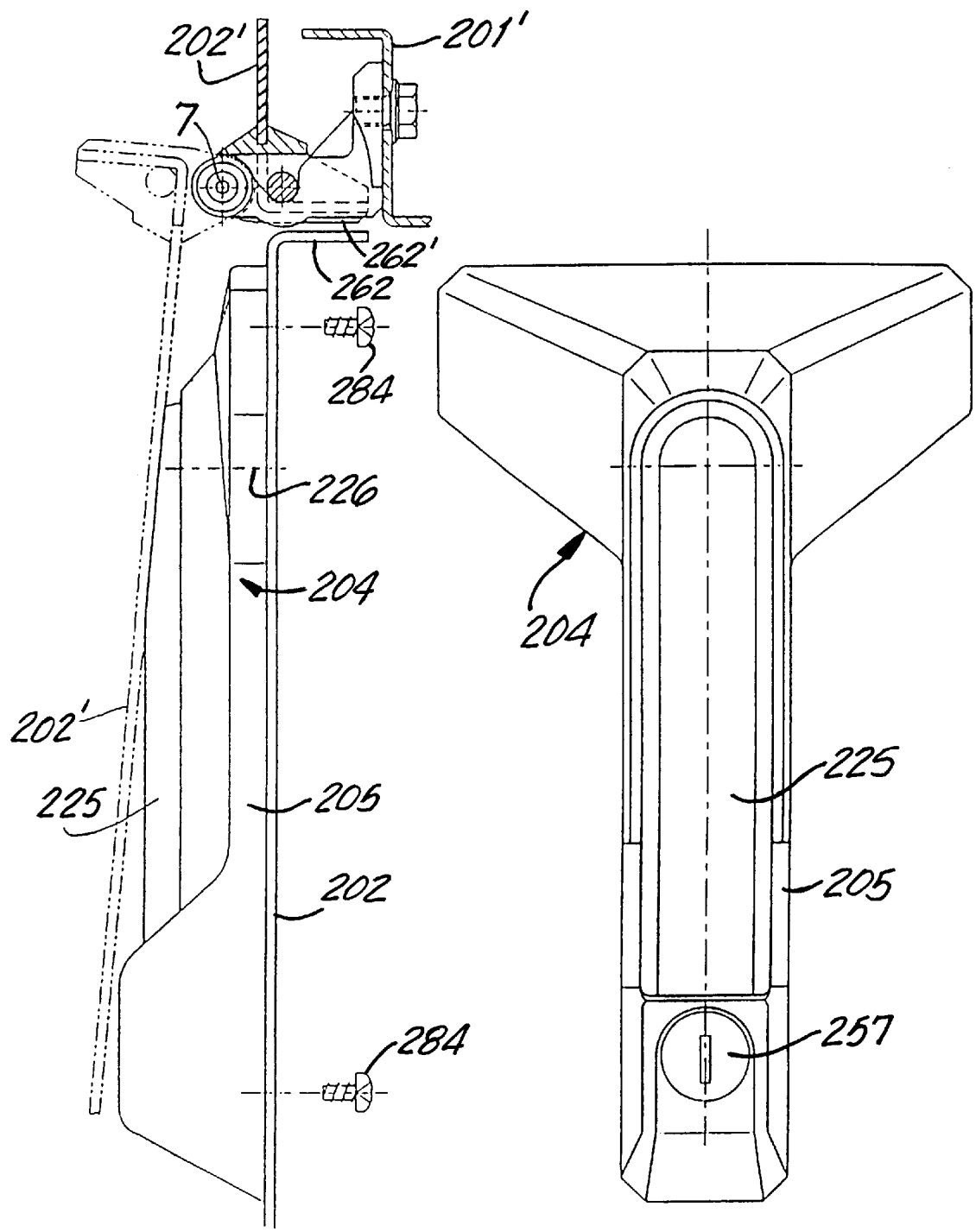
FIG. 35 is a side view of another embodiment form of the closing device which does not penetrate the door leaf.
FIG. 36 is a top view of the arrangement in FIG. 35.

In the embodiment form shown in FIGS. 35 and 36, the door plate does not penetrate the door leaf 202 at any point. It is secured by screws 284 that are inserted through corresponding round openings in the door leaf 202 and screwed into corresponding threaded bore holes in the door plate 204. FIG. 35 also shows a further distinction in that, in this case, it is not the end of the swivel lever 225, but rather its base plate 105 that has a cylinder lock (see cylinder lock 257).

The construction according to FIGS. 35, 36, 37 and 38 show in a particularly clear manner the advantages resulting when the closure is used in row cabinet installations. FIG. 35 shows the door leaf 202 of a first row cabinet and the door leaf 202' of another cabinet arranged directly adjacent to it. The folds 262 of door leaf 202 and the fold 262' of door leaf 202' are a few millimeters apart. The door leaf 202' is articulated at a cabinet frame 201' so as to be swivelable about a pin 7 and enables an opening angle of 180° for the door leaf 202' when a cabinet is installed closely adjacent to the next cabinet. In order to achieve the full opening angle of 180°, however, it was necessary to change the folding direction of consecutive cabinets. Accordingly, the hinges 7 lay next to one another. However, if the folding of two consecutive cabinets, in this case 202 and 202', is identical (in the present case, toward the left) as is shown in FIG. 35, a door leaf hinge 7 no longer lies directly next to another door leaf hinge 7 of the next cabinet, but lies rather in the region of a door plate 204 projecting over the door leaf as can be seen in this case. Depending on the height of this door plate, the door plate accordingly hinders the door leaf 262' from opening fully 180° as can be seen in this case. The closer the door plate 204 is to the fold 262 of the door leaf 202 and the higher it projects over the outer surface of the door leaf, the greater this hindrance becomes. The closing device, according to the invention, with the respective locking bar makes it possible to improve these conditions. In the first place, if the actuating axis of the closure, designated by 226 in FIG. 35, is backed off from the door edge 262, the extent to which the door leaf 202' can be swiveled is only slightly restricted, even in the case of high actuating devices. In the second place, embodiment forms are made possible in which locks for a swivel lever which project up especially far do not lie close to the door fold 262 but rather are far away from this edge, namely with the actuating lever arranged horizontally so that its free end with the high lock device 257, for example, moves in the direction of the center of the door and is no longer troublesome.

These steps also make it possible, for example, according to the embodiment form in FIGS. 35, 36 and 37, 38, to dispense with a larger opening in the door leaf and, e.g., to accommodate the locking device 257 entirely on the front face of the door leaf, so that, although the construction height increases as can clearly be seen from the lower part of FIG. 35, this elevated construction lies far from the fold 272 of the door leaf 202 because of the horizontal arrangement.

Figures 37, 38:
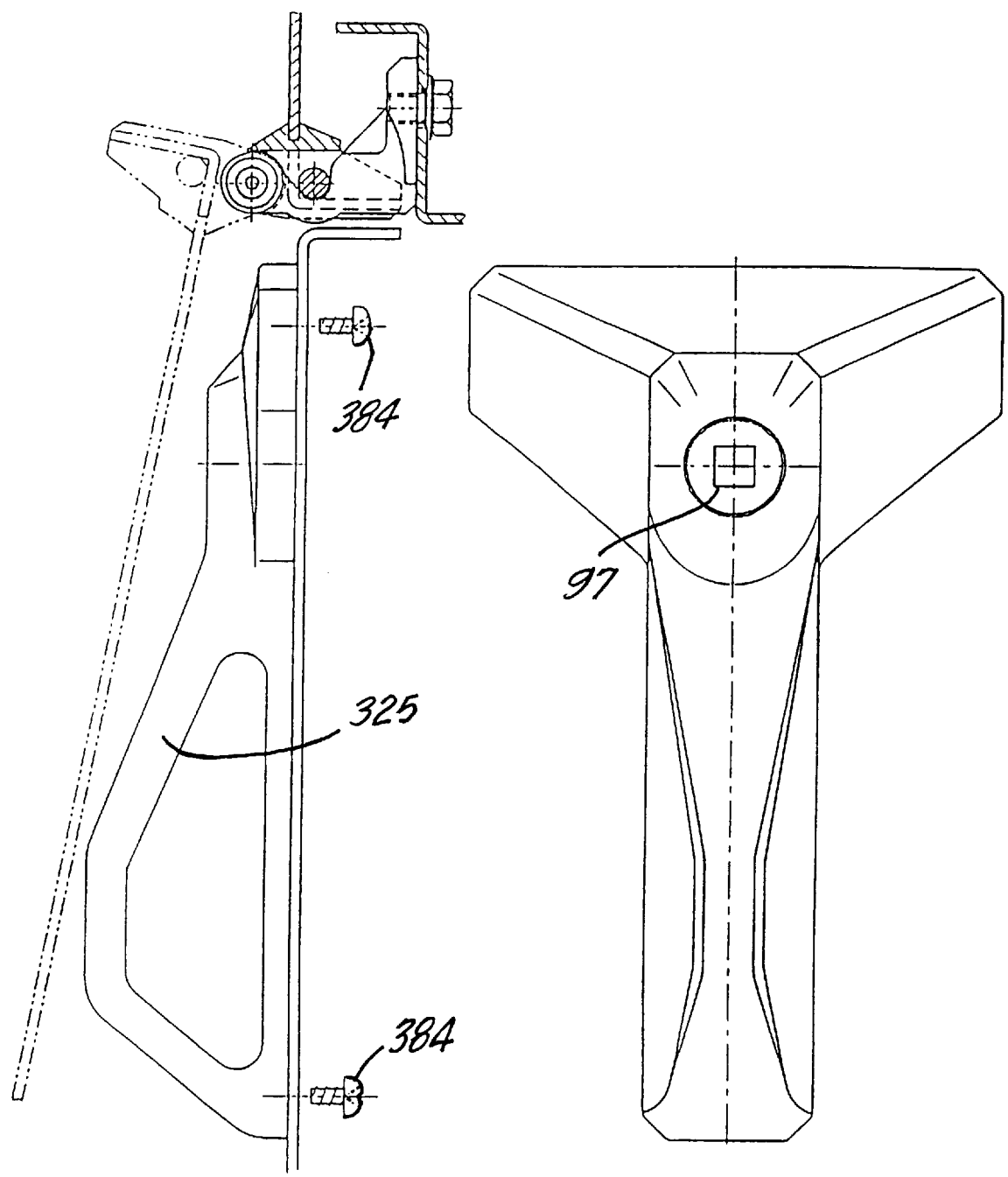
FIGS. 37 and 38 are views similar to those in FIGS. 35 and 36 showing a closure without a swivel lever.

Similar considerations apply to the embodiment form according to FIGS. 37 and 38, in which a stationary handle 325 which may also be screwed to the door leaf 302 by screw bolts 384 is provided instead of a handle that swivels out. The spindle pinion which is also present in this embodiment form is provided in this case with an insert wrench socket 97, which is rectangular in the present case, wherein a corresponding actuating wrench is inserted into this socket and the spindle pinion can then be turned.

The device can be applied commercially in a variety of environments, for example, in the construction of switch boxes.

While the foregoing description and drawings represent the preferred embodiments of the present invention, it will be obvious to those skilled in the art that various changes and modifications may be made therein without departing from the spirit and scope of the present invention.

What is claimed is:

1. In a locking device having a locking bar and a swivel lever for rotating a pinion having teeth to effect locking and unlocking states of said locking device, the improvement comprising:
   a driving element interposed between the locking bar and the pinion, said driving element for imparting linear motion to said locking bar upon rotation of the swivel lever and pinion;
   said driving element comprising:
      a push plate having teeth adapted to engage the pinion, said push plate providing an opening; and,
      a bar-shaped driver having a projection adapted to engage the opening of the push plate, said bar-shaped driver being removably connectable to the locking bar;
   wherein said swivel lever is adapted for mounting on a planar surface, said swivel lever being moveable about first and second axes; said first axis being perpendicular to the planar surface and said second axis being parallel to the planar surface.

2. The locking device of claim 1, wherein said push plate provides a number of openings to permit alternate positioning of said bar-shaped driver relative to said push plate for adjustment of said locking device.

3. The locking device of claim 1, wherein said bar-shaped driver provides a number of bore holes adapted for receiving a connecting screw, the number of holes permitting alternate positioning of said bar-shaped driver relative to said locking bar for adjustment of said locking device.

4. The locking device of claim 1, wherein said locking bar is straight.

5. The locking device of claim 1, wherein said locking bar is adapted to engage a locking element.

6. Swivel lever closing device, comprising:
   a door plate having a base plate with a swivel lever serving as a handle and with protuberances serving to engage in cut outs in the door, a protuberance being formed at one end of the door plate in the region of a locking arrangement for the swivel lever;
   an articulated spindle pinion;
   a locking bar in working connection with the swivel lever and the articulated spindle pinion, receptacles in the cabinet for locking elements formed in the region of the locking bar, the door plate having a first door plate region and a second door plate region, the first door plate region being formed by the base plate whose protuberances, as a retaining block, being secured in the cut outs in the door leaf or the like, and the second door plate region being formed by a lateral shoulder connected with the base plate to form one or more parts;
   a push plate adjustable in a direction parallel to the axis of the locking bar, said push plate being supported at an inside of the lateral shoulder, said locking bar forming projections, punched-out portions or pressed out portions, which project from the locking bar so as to be integral therewith and which produce a working connection between the locking bar and the push plate, and which form locking elements which run into receptacles in the cabinet, said projections, punched out portions and/or pressed out portions being symmetrically disposed with respect to the center of the longitudinal extension of the bar.

7. The swivel lever closing device according to claim 6, wherein the punched-out portions and/or pressed out portions which project from the locking bar so as to be integral therewith and which form the locking elements are also configured in a symmetrical manner with respect to the center of the longer transverse extension of the locking bar.

8. The swivel lever closing device according to claim 6, wherein the locking bar, to form the locking element in the region of the cross-sectional center of the locking bar profile, is offset from its longitudinal plane over at least a portion of its longitudinal extension, and the locking bar profile, with one of its offset narrow edges, forms the locking surface in the offset portion or adjacent thereto, wherein a receptacle arranged in the cabinet parallel to the locking bar plane engages over the locking surface.

9. The swivel lever closing device according to claim 8, wherein the locking bar is offset in its offset portion by an amount corresponding to the thickness of the locking bar or corresponding to twice the thickness of the locking bar.

10. The swivel lever closing device according to claim 9, wherein the narrow edges of the offset portion form sloping surfaces.

11. The swivel lever closing device according to claim 9, wherein the offset portion forms a circle as viewed from the top.

12. The swivel lever closing device according to claim 9, wherein the offset portion forms a double-sided truncated pyramid as viewed from the top.

13. The swivel lever closing device according to claim 9, wherein the offset portion forms a circle with adjoining truncated pyramids as viewed from the top.

14. The swivel lever closing device according to claim 9, wherein the offset portion is a locking protrusion formed by pressing out material or by stamping out material.

15. The swivel lever closing device according to claim 9, wherein the offset portion is formed by punching out material.

16. The swivel lever closing device according to claim 6, wherein the cabinet-side receptacle for the bar-side locking element is L-shaped, wherein one side of the L serves to fasten the receptacle and the other side of the L forms, at its free end, a hook part which engages the locking surface of the locking bar.

17. The swivel lever closing device according to claim 16, wherein the receptacle forms, at the free end of the fastening side of the L, a guide web for one broad side of the locking portion of the locking bar.

18. The swivel lever closing device according to claim 17, wherein the guide web has a diagonal or curved run-up surface in the direction of displacement of the bar.

19. The swivel lever closing device according to claim 17, wherein the guide web has a diagonal or curved run-up surface in the direction vertical to the bar axis.

20. The swivel lever closing device according to claim 6, wherein one side of the L-shaped receptacle has openings for fastening screws which are aligned with the bar plane that is not offset.

21. The swivel lever closing device according to claim 6, wherein the bore hole for fastening the receptacle lies outside the alignment of the hook part of the receptacle, or the hook part is set back in the region of the bore hole making the head of a fastening screw accessible for an appropriate tool such as a screwdriver.

22. The swivel lever closing device according to claim 6, wherein a different protuberance or a second protuberance is formed at the other end of the door plate and arranged at the door plate symmetrically with respect to rotation so as to be offset by 180° with reference to the actuating axis of the swivel lever.

23. The swivel lever closing device according to claim 22, wherein the door plate has a first door plate region and a second door plate region, wherein the first door plate region is formed by a base plate whose protuberances, as upper and lower retaining blocks, can be secured in cut outs in a door leaf, while a second door plate region is formed by a lateral shoulder that is connected with the base plate so as to form one or more parts, a vertically adjustable push plate being supported at the inside of the lateral shoulder.

24. The closing device according to claim 6, wherein the door plate has, in addition to or instead of the retaining blocks, threaded bore holes in its surface facing the door leaf, wherein fastening screws which extend through the door leaf can be introduced into the threaded bore holes.

25. The closing device according to claim 6, wherein the articulated spindle pinion is connected with the push plate via meshing teeth, and the push plate is connected with the locking bar via a recess/projection, and the articulated spindle pinion and push plate are received by the base plate and/or by the lateral shoulder virtually in a positive engagement.

* * * * *